US011496624B2

(12) United States Patent
Willshire

(10) Patent No.: US 11,496,624 B2
(45) Date of Patent: *Nov. 8, 2022

(54) SYSTEM AND METHODS FOR OPERATING AND TESTING REAL-TIME COMMUNICATIONS BETWEEN WEB BROWSERS AND CONTACT CENTERS

(71) Applicant: Cyara Solutions Pty Ltd, Hawthorn (AU)

(72) Inventor: Geoff Willshire, Greenslopes (AU)

(73) Assignee: CYARA SOLUTIONS PTY LTD, Hawthorn (AU)

( * ) Notice: Subject to any disclaimer, the term of this patent is extended or adjusted under 35 U.S.C. 154(b) by 0 days.

This patent is subject to a terminal disclaimer.

(21) Appl. No.: 17/337,933

(22) Filed: Jun. 3, 2021

(65) Prior Publication Data
US 2022/0060581 A1 Feb. 24, 2022

Related U.S. Application Data

(63) Continuation of application No. 16/999,028, filed on Aug. 20, 2020, now Pat. No. 11,095,774.

(51) Int. Cl.
*H04M 3/51* (2006.01)
*H04L 29/06* (2006.01)
*H04L 67/133* (2022.01)

(52) U.S. Cl.
CPC ........ *H04M 3/5175* (2013.01); *H04L 67/133* (2022.05); *H04M 3/5191* (2013.01)

(58) Field of Classification Search
CPC .... H04M 3/5175; H04M 3/5191; H04L 67/40
USPC ............ 379/265.09, 266.01, 265.06, 265.05, 379/265.01, 265.07, 265.11, 242
See application file for complete search history.

(56) References Cited

U.S. PATENT DOCUMENTS 6,611,498 B1 * 8/2003 Baker ................... H04L 41/142
370/386
2016/0219143 A1 * 7/2016 Zilles .................... H04M 3/242

\* cited by examiner

*Primary Examiner* — Thjuan K Addy
(74) *Attorney, Agent, or Firm* — Galvin Patent Law LLC; Brian R. Galvin

(57) ABSTRACT

A system and method for operating and testing real-time communications between web browsers and contact centers, comprising an operator network, cloud contact center, cloud contact center agent application, and a synthetic software agent comprised of agent automation software, injected API shim code, virtual audio devices, audio processing applications, and media servers, capable of performing automated end to end communication testing. In order to provide end to end testing, especially with respect to voice quality, the synthetic agent software may control and monitor the audio channels (both send and receive) of the browser communication session.

14 Claims, 31 Drawing Sheets

SYSTEM AND METHODS FOR OPERATING AND TESTING REAL-TIME COMMUNICATIONS BETWEEN WEB BROWSERS AND CONTACT CENTERS

CROSS-REFERENCE TO RELATED APPLICATIONS

Priority is claimed in the application data sheet to the following patents or patent applications, the entire written description of each of which is expressly incorporated herein by reference in its entirety:
Ser. No. 16/999,028

BACKGROUND OF THE INVENTION

Field of the Art

The disclosure relates to the field of web technology, more specifically to the field of real-time communications between web browsers and testing thereof.

Discussion of the State of the Art

WebRTC (Web Real-Time Communication) is a free, open-source technology that provides web browsers and mobile applications with real-time communication (RTC) via simple application programming interfaces (APIs). It allows audio and video communication to work inside web pages by allowing direct peer-to-peer communication, eliminating the need to install plugins or download native apps. Supported by numerous corporations and software projects, WebRTC is being standardized through the WORLD WIDE WEB CONSORTIUM™ (W3C) and the INTERNET ENGINEERING TASK FORCE™ (IETF).

WebRTC is largely responsible for the gradual replacement of older technologies that aimed at providing real time communications between browsers and either other browsers or servers, such as ACTIVEX™, that provided the ability for browsers through extensions to handle real time communication, while using more traditional VoIP technologies such as Session Initiation Protocol ("SIP") for signaling and G.711 and G.729 for media encoding. WebRTC introduced completely different technologies and a different approach to solve a similar problem, but many of these technologies (ICE/STUN/TURN, WebRTC Native) are largely untested formally especially at large scale and can be problematic unless network configurations are carefully considered. Certain cloud contact center technologies such as those provided by AMAZON™ have launched utilizing WebRTC clients as a part of their contact center's customer service infrastructure, but to date have had limited ability to be automatically tested. Typically, WebRTC testing solutions in the market today utilize technologies that require large amounts of computing resources to simulate even relatively small numbers of agents, and are limited to fully automated testing of audio quality in one direction only.

What is needed is a system and method for operating and testing real-time communications between web browsers and contact centers.

SUMMARY OF THE INVENTION

Accordingly, the inventor has conceived and reduced to practice, in a preferred embodiment of the invention a system and method for operating and testing real-time communications between web browsers and contact centers, comprising an operator network, cloud contact center, cloud contact center agent application, and a synthetic software agent comprised of agent automation software, injected API shim code, virtual audio devices, audio processing applications, and media servers, capable of performing automated and to end communication testing. In order to provide end to end testing, especially with respect to voice quality, the synthetic agent software may control and monitor the audio channels (both send and receive) of the browser communication session. The following non-limiting summary of the invention is provided for clarity, and should be construed consistently with embodiments described in the detailed description below.

The invention defines the two key mechanisms the synthetic agent may use to gain access to the Real-Time Communication ("RTC") audio streams. The first mechanism is a media stream redirect mechanism that may redirect audio streams to a media server for processing, rather than processing inside the browser itself. The second mechanism, a device redirect mechanism, may maintain processing of the RTC media streams inside of the browser, but instead may direct the audio to a processing application via the use of virtual audio devices performing the voice quality testing.

Both mechanisms may provide for a similar outcome in which contact center agent and customer audio can be tested bi-directionally by simulated customers and agents. The device redirect mechanism may allow for more complete testing of the voice audio path through all software, whereas the media stream redirect mechanism may allow for greater scalability of an overall testing solution.

Voice quality testing may be performed when audio captured at either end of a conversation can be compared with the initially transmitted audio. In order to perform this comparison, it is necessary to be able control audio that is input on each applicable end of the conversation. An existing call engine allows for input and capture of audio at the customer end of the conversation via legacy methods (including SIP, H.323, and PSTN). However, agent audio in WebRTC-based contact center solutions is delivered through WebRTC technology to the agent web browser application running on their computer. In this case it is necessary to connect to these audio streams using different technologies.

In the case of the media stream redirect mechanism, agent automation software controlling the agent browser injects code to the running application inside of the browser (the code comprising HTML and Javascript) that changes the behavior of the agent application. Normally, incoming calls to the agent software triggers WebRTC Native code in the browser to negotiate with the contact center infrastructure, the contact center infrastructure then sending audio over the network to be decoded by the browser itself where it may then be sent normally to agent audio devices (such as USB or analog call center headsets). However, injected redirection code may instruct the contact center infrastructure to instead negotiate with a dedicated media server where audio may instead be sent for processing by separate voice quality testing algorithms, thus creating a bi-directional audio path directly between the media server on the agent side, and the call engine on the customer side.

In an alternative case, the audio device redirect mechanism automation software controlling the agent browser may inject code to the running application inside of the browser (the code comprising HTML and Javascript), the code changing the behavior of the agent application, however in this case it is specifically to force the application in the browser to use a specific pair of input/output audio devices, which may be implemented as virtual audio devices under the control of the software or media server, and which work in combination with a software program that implements specialized voice quality testing algorithms. In this case, network streams are still terminated by the browser, and decoding of the network audio stream will be performed by the browser, but decoded audio will be sent to the specialized voice quality algorithms via a set of virtualized audio devices.

According to an aspect of the invention, a second system for operating and testing real-time communications between web browsers and contact centers, comprising: an operator network comprising at least a processor, a memory, and a first plurality of programming instructions stored in the memory and operating on the processor, wherein the first plurality of programming instructions, when operating on the processor, cause the processor to: generate a request for testing at least one customer to agent media connection through a cloud contact center; and receive results of testing; a WebRTC API shim comprising at least a processor, a memory, and a third plurality of programming instructions stored in the memory and operating on the processor, wherein the third plurality of programming instructions, when operating on the processor, cause the processor to: communicate with a cloud contact center, through an operator network; modify the standard behavior of the hosting web browser; handle and intercept WebRTC API calls to a customer service agent's software, preventing the default browser WebRTC implementation from being utilized; communicate with media sources across a network to receive transmitted audio; facilitate communications with other computers generating the customer side of a call center conversation; handle and intercept WebRTC API calls to a web browser or other software operating a WebRTC API, preventing the default browser WebRTC implementation from being utilized; modify the standard behavior of the web browser or other software operating a WebRTC API; handle and intercept WebRTC and WebAudio API requests that enumerate available input/output audio devices available to the browser to use; and Select a specific pair of audio input/output devices to use for a browser or other software session; and an external media server comprising at least a processor, a memory, and a fourth plurality of programming instructions stored in the memory and operating on the processor, wherein the fourth plurality of programming instructions, when operating on the processor, cause the processor to: encode and decode audio and video digital data; receive signal data from a WebRTC API shim to facilitate a connection between the external media server and a cloud contact center; receive media data comprising at least audio data from a cloud contact center; send pre-recorded reference audio for testing to the far end of the media connections as requested by an operator network; receive transmitted audio and calculate voice quality by a plurality of algorithms that analyze the received audio, including full reference audio mechanisms such as P.862 PESQ; and an audio processing application comprising at least a processor, a memory, and a third plurality of programming instructions stored in the memory and operating on the processor, wherein the third plurality of programming instructions, when operating on the processor, cause the processor to: operate a plurality of virtual audio devices; relay audio from the browser WebRTC session to another software application via a virtual audio cable that is effectively a software linkage between a virtual microphone and speaker; utilize virtual audio devices through the operation of a plurality of virtual audio devices, to encode and decode digital audio data; utilize virtual audio devices through the operation of a plurality of virtual audio devices, to send pre-recorded reference audio to the browser for transmission in the WebRTC communication, whether locally operated or operated over a network, for testing of media connections; and utilize virtual audio devices through the operation of a plurality of virtual audio devices, to receive transmitted audio on the WebRTC session and calculate voice quality by a plurality of algorithms that analyze the received audio, including full reference audio mechanisms such as P.862 PESQ.

According to another aspect, a method for operating and testing real-time communications between web browsers and contact centers is disclosed, comprising the steps of: generating a request for testing at least one customer to agent media connection through a cloud contact center, using an operator network; receiving results of testing, using an operator network; handling and intercept WebRTC API calls to a web browser or other software operating a WebRTC API, preventing the default browser WebRTC implementation from being utilized, using a WebRTC API shim; modifying the standard behavior of the web browser or other software operating a WebRTC API, using a WebRTC API shim; handling and intercept WebRTC and WebAudio API requests that enumerate available input/output audio devices available to the browser to use, using a WebRTC API shim; selecting a specific pair of audio input/output devices to use for a browser or other software session, using a WebRTC API shim; operating a plurality of virtual audio devices, using an audio processing application; relaying audio from one software application to another software application with a virtual audio cable, using an audio processing application; utilizing virtual audio devices through the operation of a plurality of virtual audio devices, to encode and decode audio and video digital data, using an audio processing application; utilizing virtual audio devices through the operation of a plurality of virtual audio devices, to send pre-recorded reference audio to another application, whether locally operated or operated over a network, for testing of media connections, using an audio processing application; and utilizing virtual audio devices through the operation of a plurality of virtual audio devices, to receive transmitted audio and calculate voice quality by a plurality of algorithms that analyze the received audio, including full reference audio mechanisms such as P.862 PESQ using an audio processing application.

According to a preferred embodiment, a method for browser-based testing of audio and video communications via the Internet is disclosed, comprising the steps of: opening an instance of a web browser on a first computer, wherein the web browser: comprises a client application within the web browser configured to receive audio and video communications via the Internet; and utilizes the WebRTC protocol to handle audio and video communications, the WebRTC protocol comprising one or more application programming interfaces; polyfilling the code inside at least one of the one or more application programming interfaces to override its use of the web browser's default media applications and redirect media handling to an external media server; establishing a connection between the web browser and a second computer; using the at least one polyfilled application programming interface as a signaling interface between the second computer and the media server to establish a direct audio or video connection between the second computer and the media server; and analyzing the quality of the audio or video connection at the media server.

BRIEF DESCRIPTION OF THE DRAWING FIGURES

The accompanying drawings illustrate several aspects and, together with the description, serve to explain the principles of the invention according to the aspects. It will be appreciated by one skilled in the art that the particular arrangements illustrated in the drawings are merely exemplary, and are not to be considered as limiting of the scope of the invention or the claims herein in any way.

DETAILED DESCRIPTION

Figure 1:
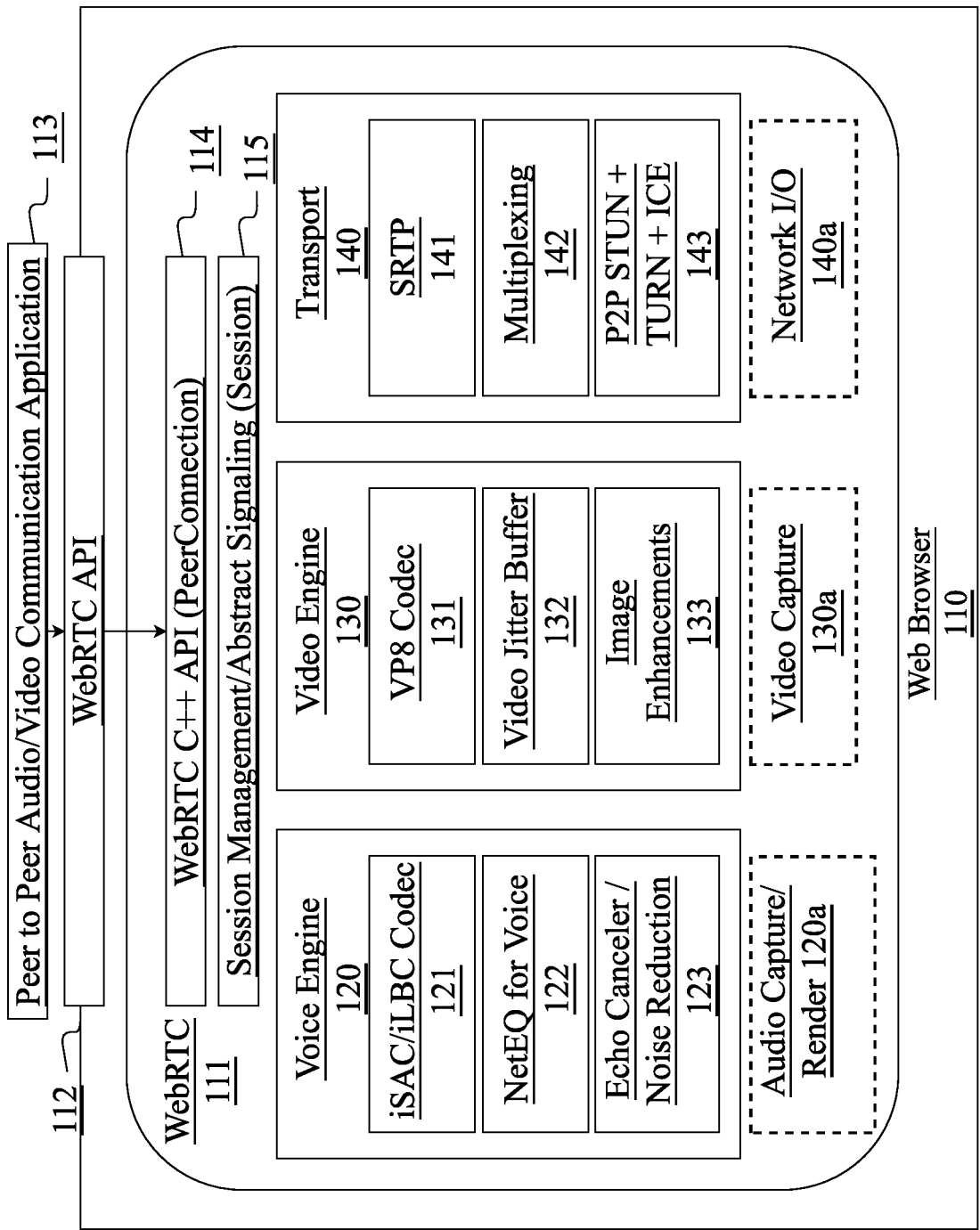
FIG. 1 (PRIOR ART) is a system diagram illustrating the architecture of WebRTC technology.

The inventor has conceived, and reduced to practice, a system and method for operating and testing real-time communications between web browsers and contact centers.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Definitions

"Shim" as used herein refers to a middleware library that intercepts API calls and changes arguments passed, handles the operation itself, or redirects the operation elsewhere, for the purposes of extended, replacing, or redirecting functionality on a local software execution that receives API requests from another piece of software. A shim may operate with, in, or as part of a web browser, or other application, and may achieve many different effects, and may be written in any computer programming language supported by the machine and operating system in use.

"Polyfill" as used herein refers to a middleware code execution that implements a feature or features on web browsers that is not normally or natively supported on the web browser, or allows for the modification of an existing feature inside of the browser, and is often but not always written or implemented as a JAVASCRIPT™ library that implements an HTML5™ web standard. A polyfill may be written in other languages and achieve other desired effects, but is at least, and always, middleware code that implements new features on a web browser that did not have the features before. It provides a means to override built in WebRTC APIs to allow for the interception of signaling information, to allow RTC media to be directed outside of the browser itself.

Conceptual Architecture

FIG. 1 (PRIOR ART) is a system diagram illustrating the architecture of WebRTC technology. A web browser 110 is operated on a computer, such as CHROME™, INTERNET EXPLORER™, OPERA™, or other web browsers, operates with WebRTC 111 installed. WebRTC 111 may comprise a number of different technologies and software, including JavaScript APIs as defined by the W3C, low level communication and media device control code (known as "WebRTC Native"), a variety of Network Address Translation ("NAT") traversal technologies including or surpassing uPnP in capabilities, built-in security for incoming and outgoing media communications, and modern audio and video codecs. The WebRTC 111 software is accessible to exterior connections via a WebRTC API 112, for the purpose of operating with peer-to-peer (p2p) audio or video communications applications 113. Such applications include, for example, video chat applications, VoIP (Voice over Internet Protocol) applications or tools, and the like. A WebRTC C++ API 114 exists which may be accessed by PeerConnection or RTCPeerConnection calls, and enables audio and video communications between connected peers, providing signal processing, codec handling, p2p communication, security, and bandwidth management. The API 114 may accept Session Description Protocol ("SDP") information to identify the requirements for communications between the two peers, the SDP information possibly including at least information about the media types being used, the codecs allowed and used by the peers, and encryption parameters. The C++ API 114 may also handle Interactive Connectivity Establishment ("ICE") negotiation, to attempt to find the clearest end-to-end path for media communications between peers, using NAT traversal techniques. Session management functionality may be accessed with a handle of Session 115 in software utilizing WebRTC, handling signaling data and session identification protocol ("SIP") information. The software components that allow media capture and processing and signaling are a voice engine 120, video engine 130, and transport engine 140, each with separate sub-components responsible for specific operation in the WebRTC software. An internet Speech Audio Codec ("iSAC") and internet Low Bitrate Codec ("iLBC") are both installed 121 as part of the voice engine 120, for encoding and decoding of audio data according to either codec for p2p communications. A NetEQ component is installed 122 which is an applied software algorithm that reduces jitter and conceals errors in audio data to mitigate the effects of audio jitter and packet loss during communications, also designed to keep latency to a minimum. An echo canceler or noise reducer (or both) are installed 123 to reduce the effects of audio echo and background noise in outgoing audio data. A video engine has components installed or built into it including a VP8 codec 131, an open source and commonly used video compression format; a video jitter buffer 132 similar in concept to the NetEQ 122, meant to reduce the jitter and error prevalence in video media; and a set of image enhancement tools 133 for sharpening, brightening, or otherwise performing basic modifications to images for enhancement during communications, as needed. The transport engine 140 contains software for Secure Real-Time Transport Protocol ("SRTP") 141, signal multiplexing 142, and p2p Session Traversal Utilities for NAT ("STUN"), Traversal Using Relays around NAT ("TURN"), and ICE software 143, for communications with peers behind network address translators such as firewalls or local internet routers. The voice engine 120, video engine 130, and transport engine 140, each provide a part of the functionality of WebRTC 111, including an audio capture/render capability 120a, video capture and rendering 130a, and network input/output ("I/O") capabilities 140a.

Figure 2:
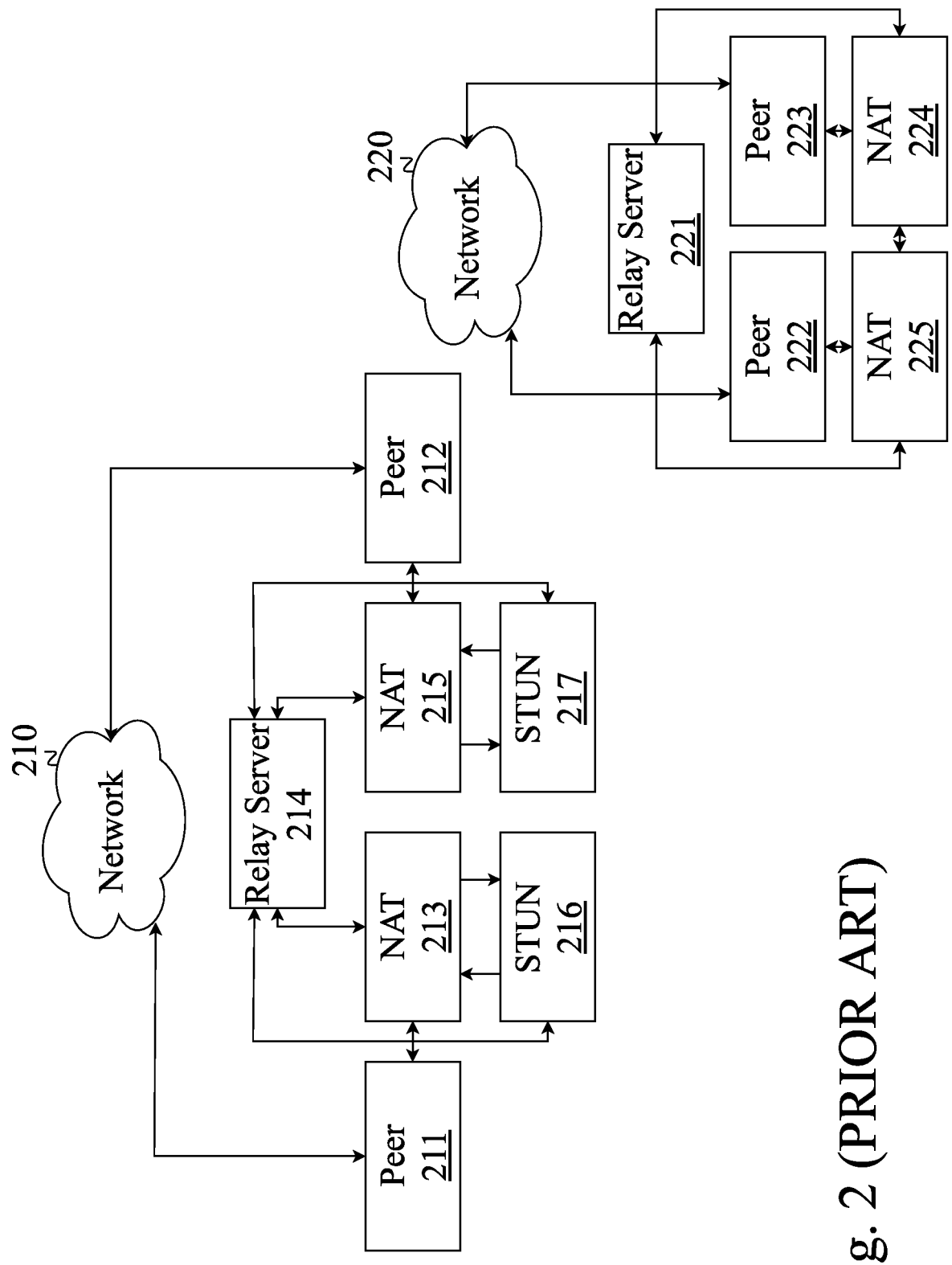
FIG. 2 (PRIOR ART) is a system diagram illustrating the architecture of WebRTC NAT traversal technology.

FIG. 2 (PRIOR ART) is a system diagram illustrating the architecture of WebRTC NAT traversal technology. Two embodiments are shown, each utilizing a different network 210, 220 architecture. In the first architecture, two peers 211, 212 who wish to share media data are shown, and each is protected behind a NAT system 213, 215. This prevents them from easily or directly communicating with each other to share data over most protocols. A relay server 214 connects the two NAT 213, 215 systems, known as a TURN server 214. Further, two Session Traversal Utilities for NAT ("STUN") servers 216, 217 connect to the NATs. A STUN server provides a standardized set of methods, including a network protocol, for traversal of NAT gateways in applications of real-time voice, video, messaging, and other communications. A STUN server 216, 217 provides data to a requesting server or service that does not have access to the addresses behind a NAT 213, 215 such as the peers 211, 212, such as a relay server, which may poll the relevant data from both STUNs 216, 217 to send data to the peers 211, 212 behind the NAT systems, allowing them to communicate with each other. A second implementation is shown, without any STUN servers, in which NAT systems 225, 224 communicate not just with their respective peers 222, 223 and a TURN server 221, but also communicate with each other, in order to facilitate ICE frameworks in the peers' WebRTC APIs to share their addresses directly without a STUN.

Figure 3:
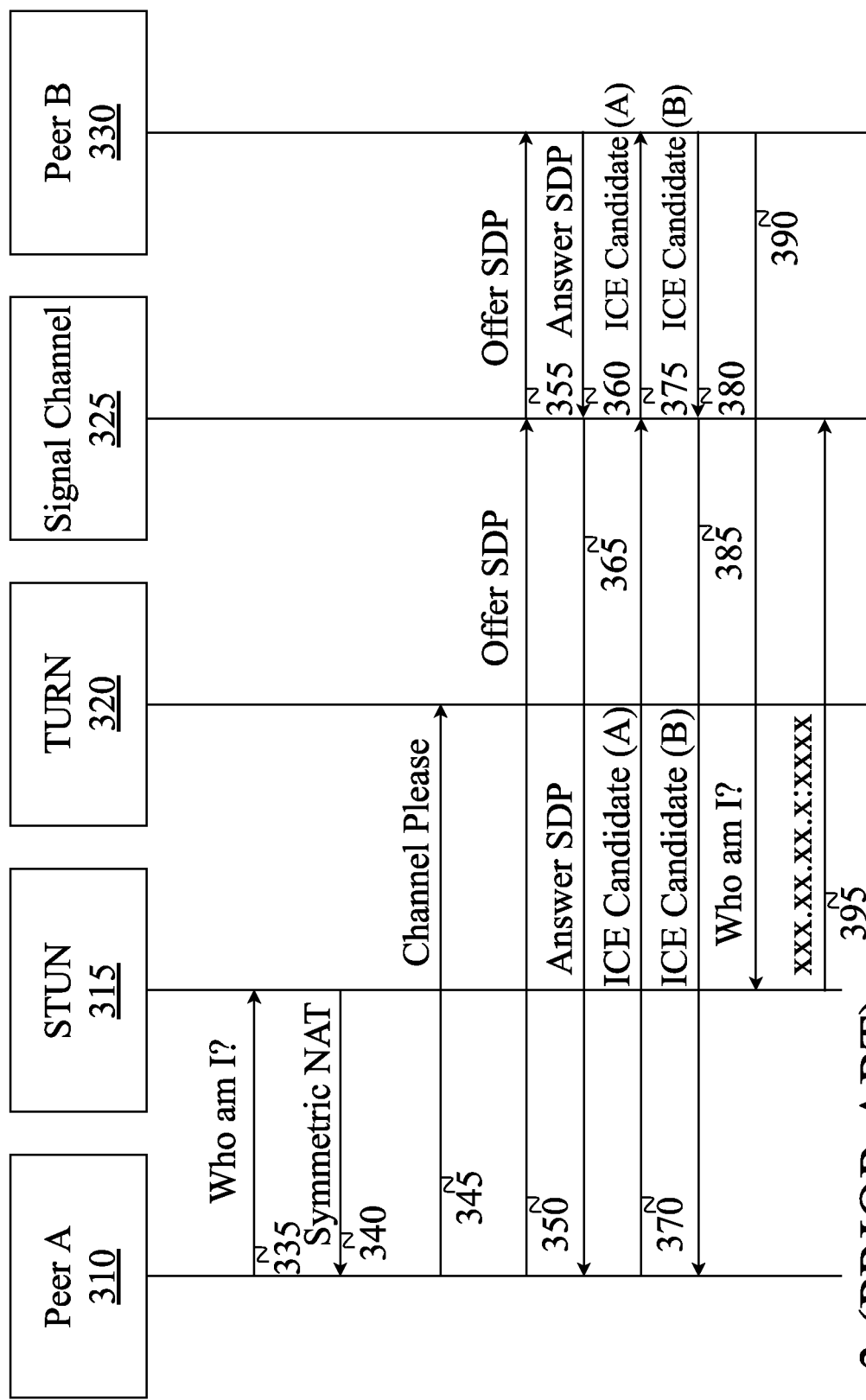
FIG. 3 (PRIOR ART) is a message flow diagram illustrating the architecture of WebRTC interactive connectivity establishment technology.

FIG. 3 (PRIOR ART) is a message flow diagram illustrating the architecture of WebRTC interactive connectivity establishment technology. Components or systems sharing data messages include a peer A 310, STUN server 315, TURN server 320, signal channel 325, and peer B 330. First, a peer A sends a message to a connected STUN server 315, asking for their own address and identifying information 335, before getting a response back that defines the symmetric NAT to the peer A 340. A symmetric NAT is a NAT in which requests sent from the same internal IP address and port to the same destination IP address, is mapped to a unique external source IP address and port, reachable from the STUN server. Peer A 310 then requests channel information from the TURN server 320, 345, binding a channel to themselves for eventual connection to peer B 330, before peer A is able to offer Session Description Protocol ("SDP") information across the signal channel 350 to peer B 330, 355. Peer B is able to respond to the SDP request to begin enabling media communications between the two peers 360, 365, at which point peer A may send an ICE candidate through the signal channel 370 to peer B 375. Interactive connectivity establishment (ICE) is a technique to find the most direct way for two networking peers to communicate through NAT systems. Peer B may then respond with its own ICE candidate 380, 385, finally requesting symmetric NAT information from the STUN server 390 before the addresses to communicate with each other are set up and addresses are delivered to the peers through the signal channel 395. In this way, through the use of a STUN server and TURN server, two peers behind NAT systems can establish media communications.

Figure 4:
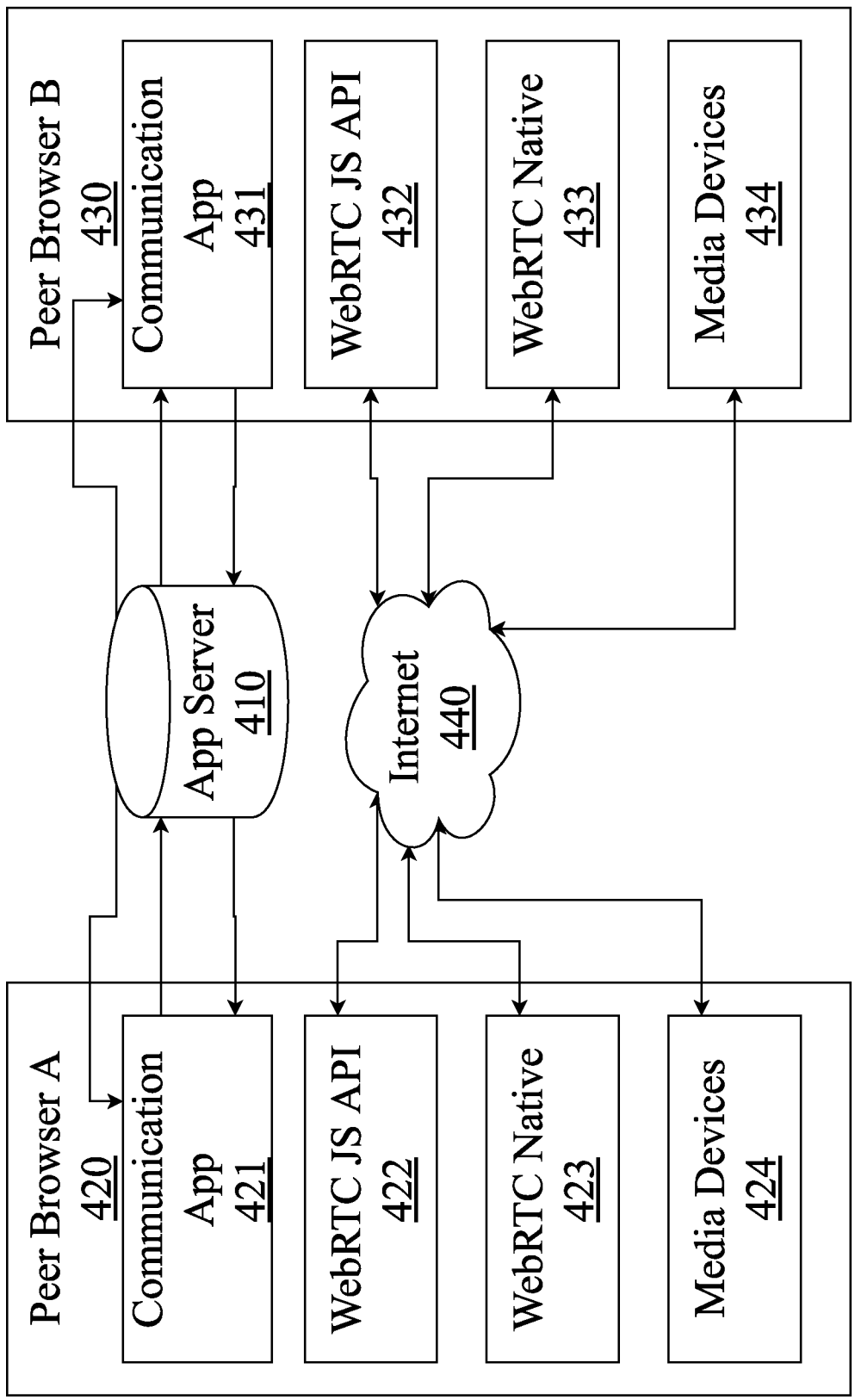
FIG. 4 (PRIOR ART) is a system diagram illustrating the architecture of WebRTC signaling flow technology.

FIG. 4 (PRIOR ART) is a system diagram illustrating the architecture of WebRTC signaling flow technology. Two peers have web browsers open, labeled A 420 and B 430, the web browsers from each not needing to be the same web browser, which could be any web browser such as SAFARI™, CHROME™, INTERNET EXPLORER™, OPERA™, and others. Each browser has several software components available to it for the purposes of using WebRTC communications, including a communication application 421, 431 which may be an application such as DISCORD™, GOOGLE CHAT™, SKYPE™, or others, a WebRTC JavaScript API 422, 432 which is a core feature of WebRTC, the WebRTC native code 423, 433 which is typically written in C++ and designed for a specific system rather than being a JavaScript API that may be implemented on a variety of system configurations, and a collection of media devices 424, 434, such as a webcam, microphone, or other media devices one might communicate over a network with. The JavaScript APIs 422, 432, WebRTC native frameworks 423, 433, and media devices 424, 434 may all communicate over the Internet 440, while communication applications 421, 431 typically communicate not just over the Internet with each other but with an application server 410. Such an application server may have the STUN and TURN functionality mentioned in other descriptions, and may provide the proper signal information for the applications to communicate, while the WebRTC code and APIs and media devices exchange media data with each other over the Internet.

Figure 5:
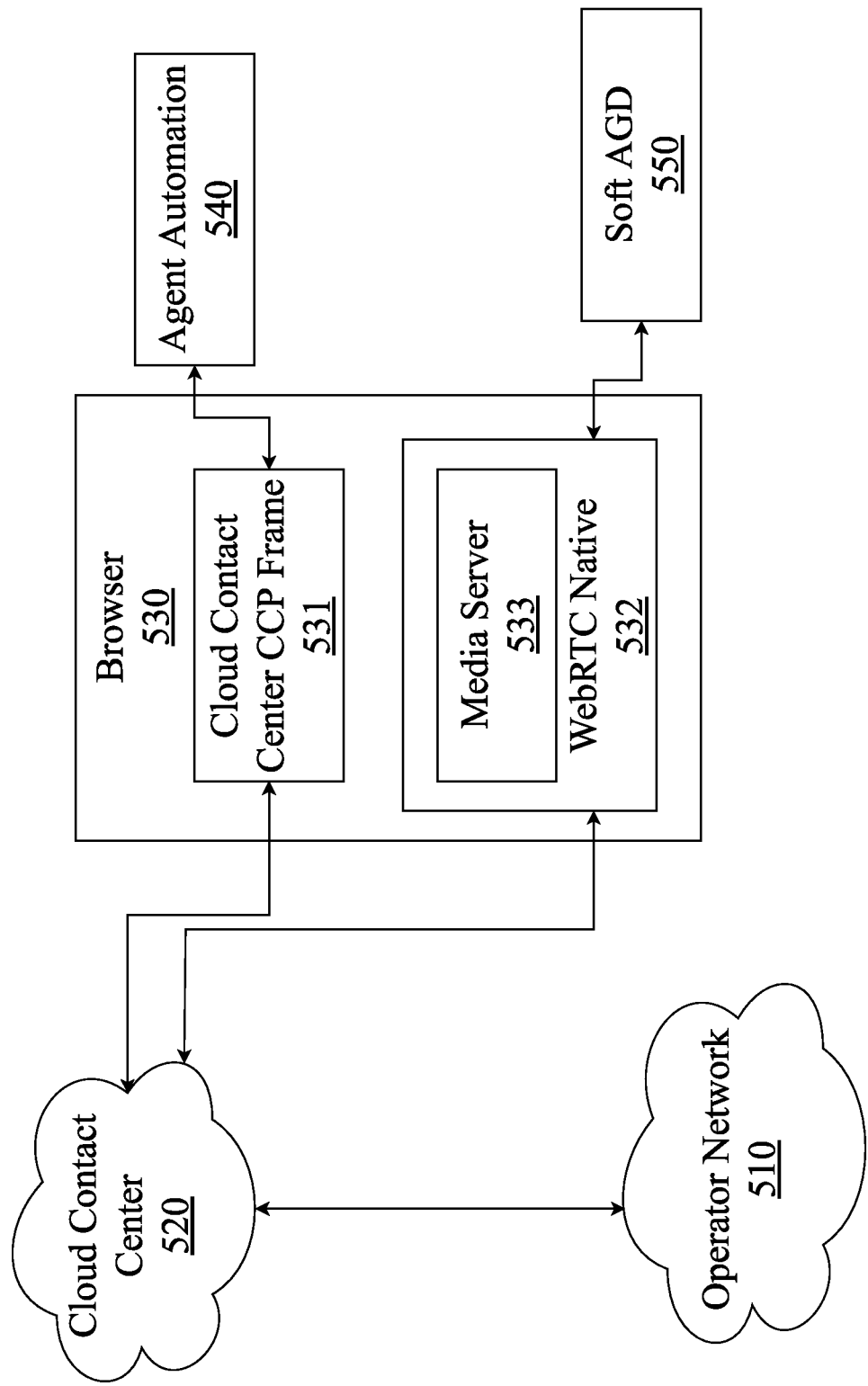
FIG. 5 is a system diagram illustrating components used in operating and testing real-time communications between web browsers with a dedicated desktop application, according to an embodiment.

FIG. 5 is a system diagram illustrating components used in operating and testing real-time communications between web browsers with a dedicated desktop application, according to an embodiment. A call and media testing operator network 510 connects over a network, or through direct connection, to a cloud contact center 520, such as over a TCP/IP connection, a UDP connection, or some other protocol of connection between devices and services. An operator network communicates with a cloud contact center to send and receive data on making calls to a cloud contact center service user for the purpose of testing and receiving the results of the testing of the infrastructure used by agents connected through the contact cloud center, and to test client-agent exchanges. A web browser 530 such as OPERA™, SAFARI™, MICROSOFT EDGE™, or others, also connects to a cloud contact center 520, through a network or through a direct connection, and may send and receive media data, with the use of a web-based contact center agent application 531, a WebRTC native implementation 532, and media server software 533. Such software is capable of processing audio and video data, encoding and decoding it, providing basic encryption and decryption services for the media data, operating audio and video enhancement software or algorithms such as anti-jitter software, and more. An automated agent simulator or agent automation engine 540 provides automated responses to simulate an agent or client or generally a "peer" in a peer-to-peer communication session, providing either a predetermined script of responses to another peer or by using a response tree, or through some other method such as with machine learning, to a web-based contact center agent application 531. An agent automation engine 540 may be operated over a network on a separate computing device, or may be operated on the same computer as the browser 530 that operates the web-based contact center agent application 531 and WebRTC native implementation 532. A software audio generation device ("AGD") 550 communicates with a WebRTC native 532 and media server 533 software, to generate audio, listen for tones, and test the WebRTC connection and software via virtual audio devices to ensure that communication between a simulated agent 540 and a peer over a WebRTC software 532 is being properly handled.

Figure 6:
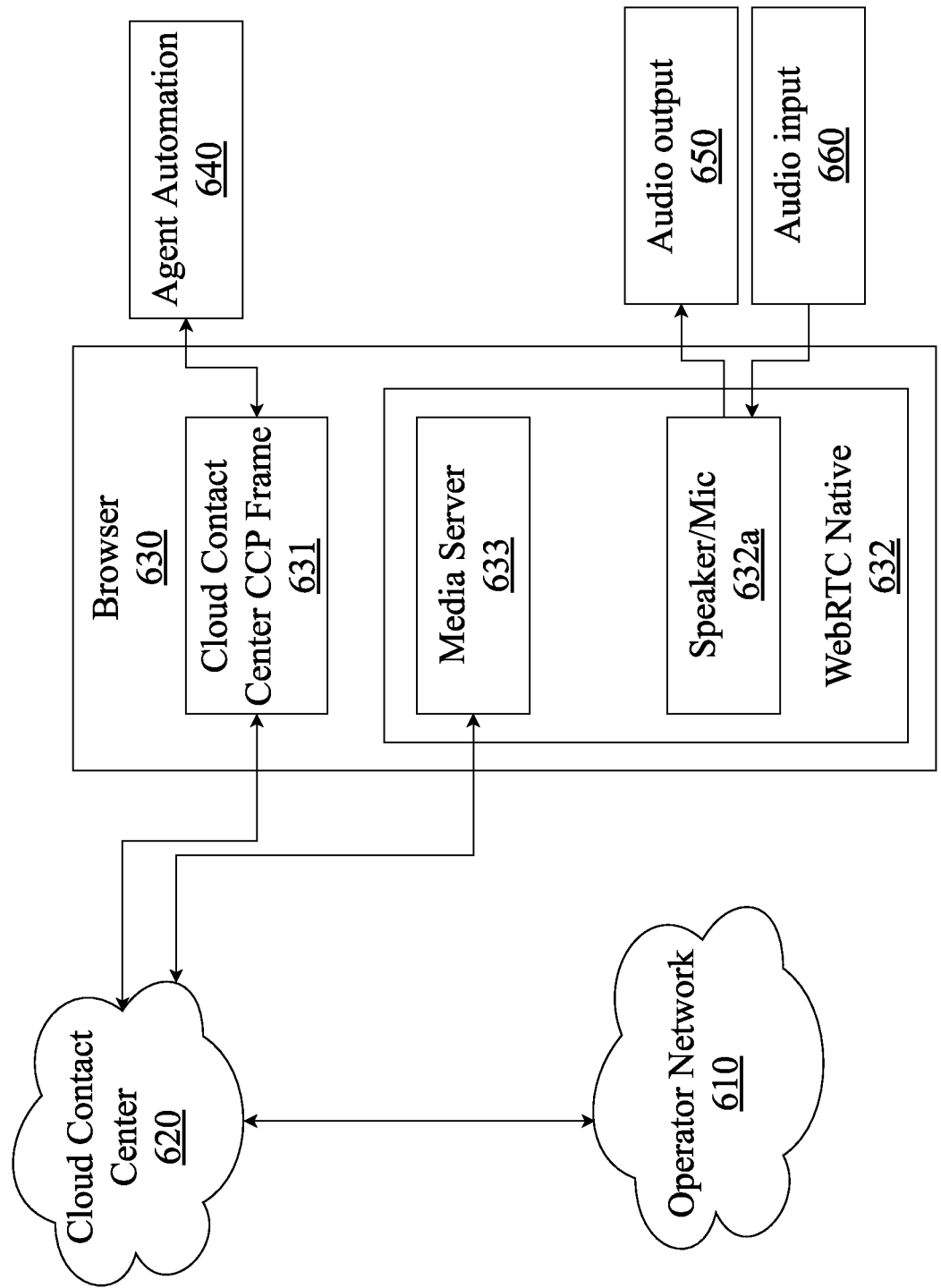
FIG. 6 is a system diagram illustrating components used in operating and testing real-time communications between web browsers without a dedicated desktop application, according to an embodiment.

FIG. 6 is a system diagram illustrating components used in operating and testing real-time communications between web browsers without a dedicated desktop application, according to an embodiment. A call and media testing operator network 610 connects over a network, or through direct connection, to a cloud contact center 620, such as over a TCP/IP connection, a UDP connection, or some other protocol of connection between devices and services. An operator network communicates with a cloud contact center to send and receive data on making calls to a cloud contact center service user for the purpose of testing and receiving the results of the testing of the infrastructure used by agents connected through the contact cloud center, and to test client-agent exchanges. A web browser 630 such as OPERA™, SAFARI™, MICROSOFT EDGE™, or others, also connects to a cloud contact center 620, through a network or through a direct connection, and may send and receive media data, with the use of a cloud contact center web-based contact center agent application 631, a WebRTC native implementation 632, and media server software 633. Such software is capable of processing audio and video data, encoding and decoding it, providing basic encryption and decryption services for the media data, operating audio and video enhancement software or algorithms such as anti-jitter software, and more. An automated agent simulator or agent automation engine 640 provides automated responses to simulate an agent or client or generally a "peer" in a peer-to-peer communication session, providing either a predetermined script of responses to another peer or by using a response tree, or through some other method such as with machine learning, to a web-based contact center agent application 631. An agent automation engine 640 may be operated over a network on a separate computing device, or may be operated on the same computer as the browser 630 that operates the web-based contact center agent application 631 and WebRTC native implementation 632. A simulated microphone and speaker 632a communicate with a WebRTC native 632 and media server 633 software, to generate audio, listen for audio, and test the WebRTC connection and software to ensure that communication between a simulated agent 640 and a peer over a WebRTC software 632 is being properly handled. Audio output 650 may be discarded or saved as a file, while audio input 660 may be a set of audio data to simulate with a simulated microphone 632a, or text descriptions of the things the system to simulate with a microphone emulator 632a, or even an audio file that is interpreted through an emulated microphone.

Figure 7:
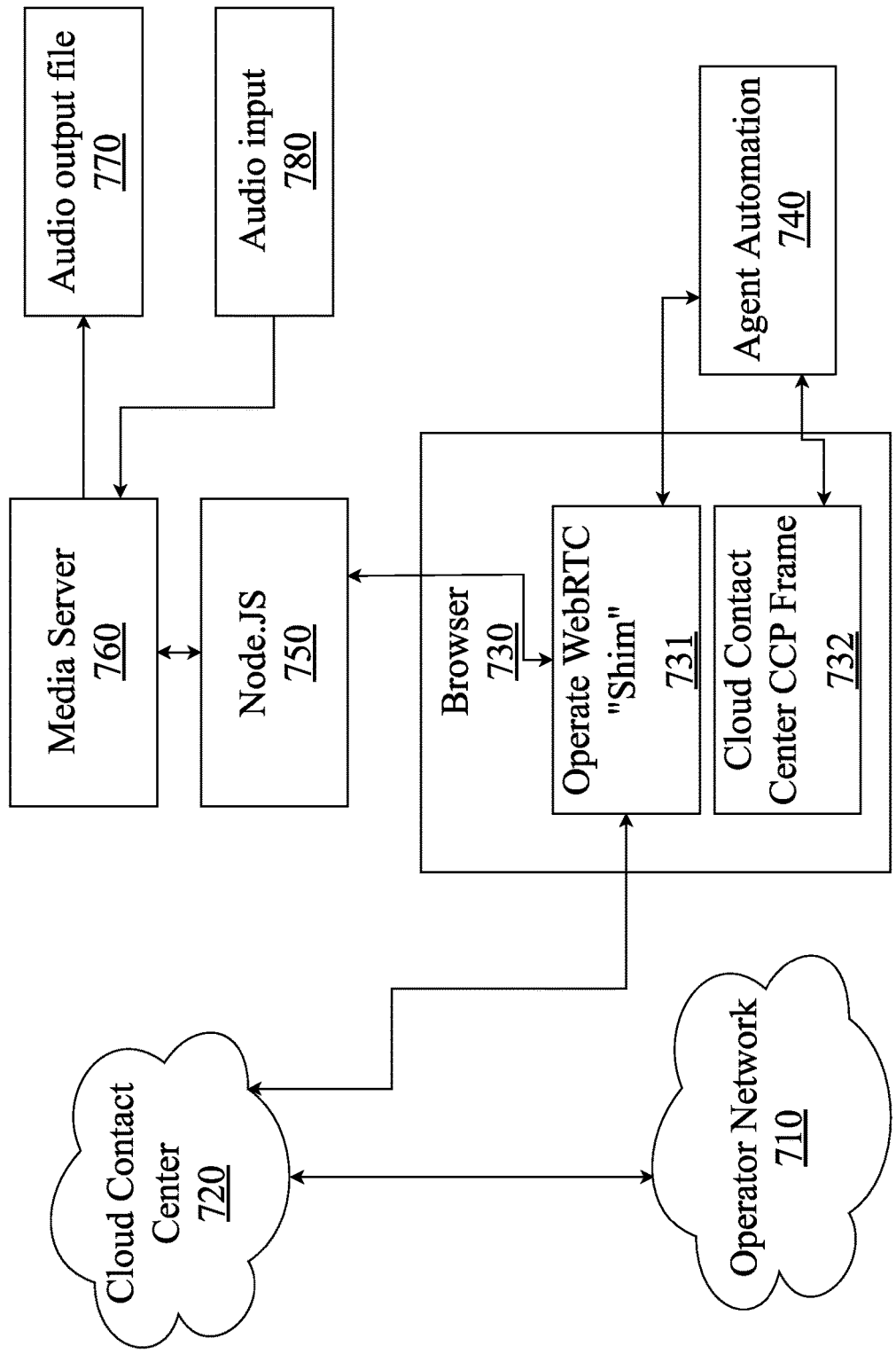
FIG. 7 is a system diagram illustrating components used in operating and testing real-time communications between web browsers using a cloud contact center such as AMAZONCONNECT™, according to an embodiment.

FIG. 7 is a system diagram illustrating components used in operating and testing real-time communications between web browsers using a cloud contact center such as AMAZONCONNECT™, according to an embodiment. A call and media testing operator network 710 connects over a network, or through direct connection, to a cloud contact center 720, such as over a TCP/IP connection, a UDP connection, a public switched telecommunication network (PSTN) or some other protocol of connection between devices and services. The operator network communicates with a cloud contact center to send and receive data on making calls to a cloud contact center service user for the purpose of testing and receiving the results of the testing of the infrastructure used by agents connected through the contact cloud center, and to test client-agent exchanges. A web browser 730 such as OPERA™, SAFARI™, MICROSOFT EDGE™, or others, also connects to a cloud contact center 720, through a network or through a direct connection, and may send and receive media data, with the use of a web-based contact center agent application 732, a WebRTC "shim" 731, and media server software 760 connected through an agent signaling mediation server, which may operate using NODE.JS™ 750. Such a NODE.JS™ intermediary may be operated on the same computer and facilitate communication between the two pieces of software 732, 760, or may be operated on another computing device and connected to over a network or direct connection. Media server 760 software is capable of processing audio and video data, encoding and decoding it, providing basic encryption and decryption services for the media data, operating audio and video enhancement software or algorithms such as anti-jitter software, and more. A WebRTC "shim" is code injected by the agent automation 740 software in this embodiment, essentially acting as a separate piece of software that interacts with the web browser 730 to intercept signals coming from the cloud contact center 720 and provide custom or modular functionality, also taking the load off the browser, and instead putting it on the code operating outside the browser process, and the media server 760, for processing media data separately from the browser itself. Browser media processing does not typically scale well for large numbers of calls, so offloading processing to an external media server may assist in increasing scalability of the testing application. An automated agent simulator or agent automation engine 740 also provides automated responses to simulate an agent or client or generally a "peer" in a peer-to-peer communication session, providing either a predetermined script of responses to another peer or by using a response tree, or through some other method such as with machine learning, to a web-based contact center agent application 731. An agent automation engine 740 may be operated over a network on a separate computing device, or may be operated on the same computer as the browser 730 that operates the web-based contact center agent application 731 and WebRTC shim 731. Audio output may be discarded or saved as a file 770, while audio input 780 may be a set of audio data to simulate with a media server software package such as KURENTO™.

Figure 8:
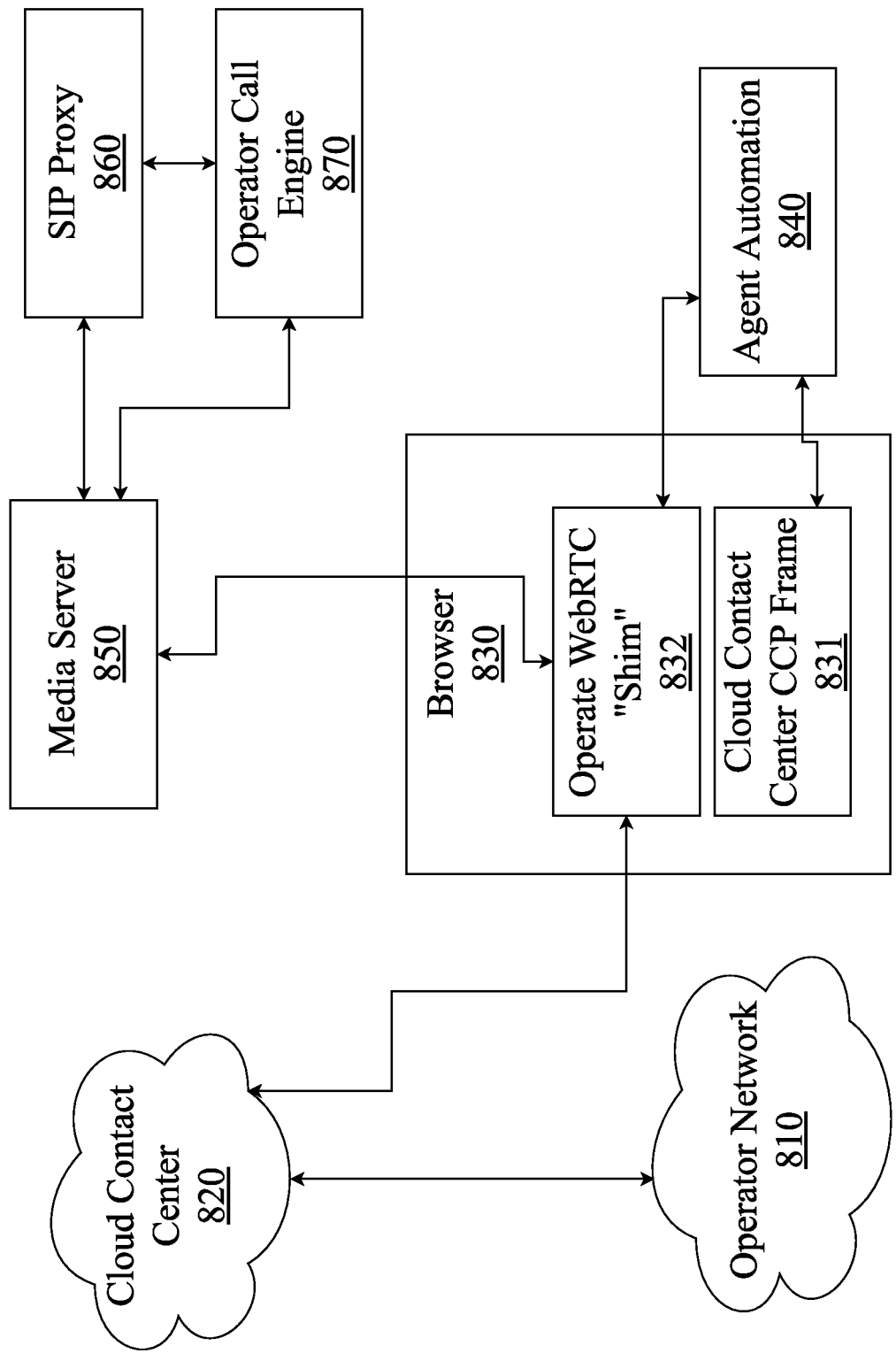
FIG. 8 is a system diagram illustrating components used in operating and testing real-time communications between web browsers using a media server as a proxy for a call engine, according to an embodiment.

FIG. 8 is a system diagram illustrating components used in operating and testing real-time communications between web browsers using a media server as a proxy for a call engine, according to an embodiment. A call and media testing operator network 810 connects over a network, or through direct connection, to a cloud contact center 820, such as over a TCP/IP connection, a UDP connection, or some other protocol of connection between devices and services. An operator network communicates with a cloud contact center to send and receive data on making calls to a cloud contact center service user for the purpose of testing and receiving the results of the testing of the infrastructure used by agents connected through the contact cloud center, and to test client-agent exchanges. A web browser 830 such as OPERA™, SAFARI™, MICROSOFT EDGE™, or others, also connects to a cloud contact center 820, through a network or through a direct connection, and may send and receive media data, with the use of a web-based contact center agent application 831, a WebRTC "shim" 832, and media server software 850 connected to over a network or with a direct connection, or operating as separate software on the same computing device. Media server 850 software is capable of processing audio and video data, encoding and decoding it, providing basic encryption and decryption services for the media data, operating audio and video enhancement software or algorithms such as anti-jitter software, and more. A Session Initiation Protocol ("SIP") proxy 860 is used to modularly handle the "handshake" and session initiation data such as what protocols, codecs, etc. are expected, communicating this with a call engine 870 which serves to simulate a peer connection across a network hiding behind an SIP proxy, for testing the media communications between the simulated peer with an automated agent system 840 and the call engine 870. A WebRTC "shim" is code injected by the agent automation 840 software in this embodiment, essentially acting as a separate piece of software that interacts with the web browser 830 to intercept signals coming from the cloud contact center 820 and provide custom or modular functionality, also taking the load off the browser, and instead putting it on the code operating outside the browser process, and the media server 850, for processing media data separately from the browser itself. An automated agent simulator or agent automation engine 840 also provides automated responses to simulate an agent or client or generally a "peer" in a peer-to-peer communication session, providing either a predetermined script of responses to another peer or by using a response tree, or through some other method such as with machine learning, to a web-based contact center agent application 832. An agent automation engine 840 may be operated over a network on a separate computing device, or may be operated on the same computer as the browser 830 that operates the web-based contact center agent application 831 and WebRTC shim 832.

Figure 9:
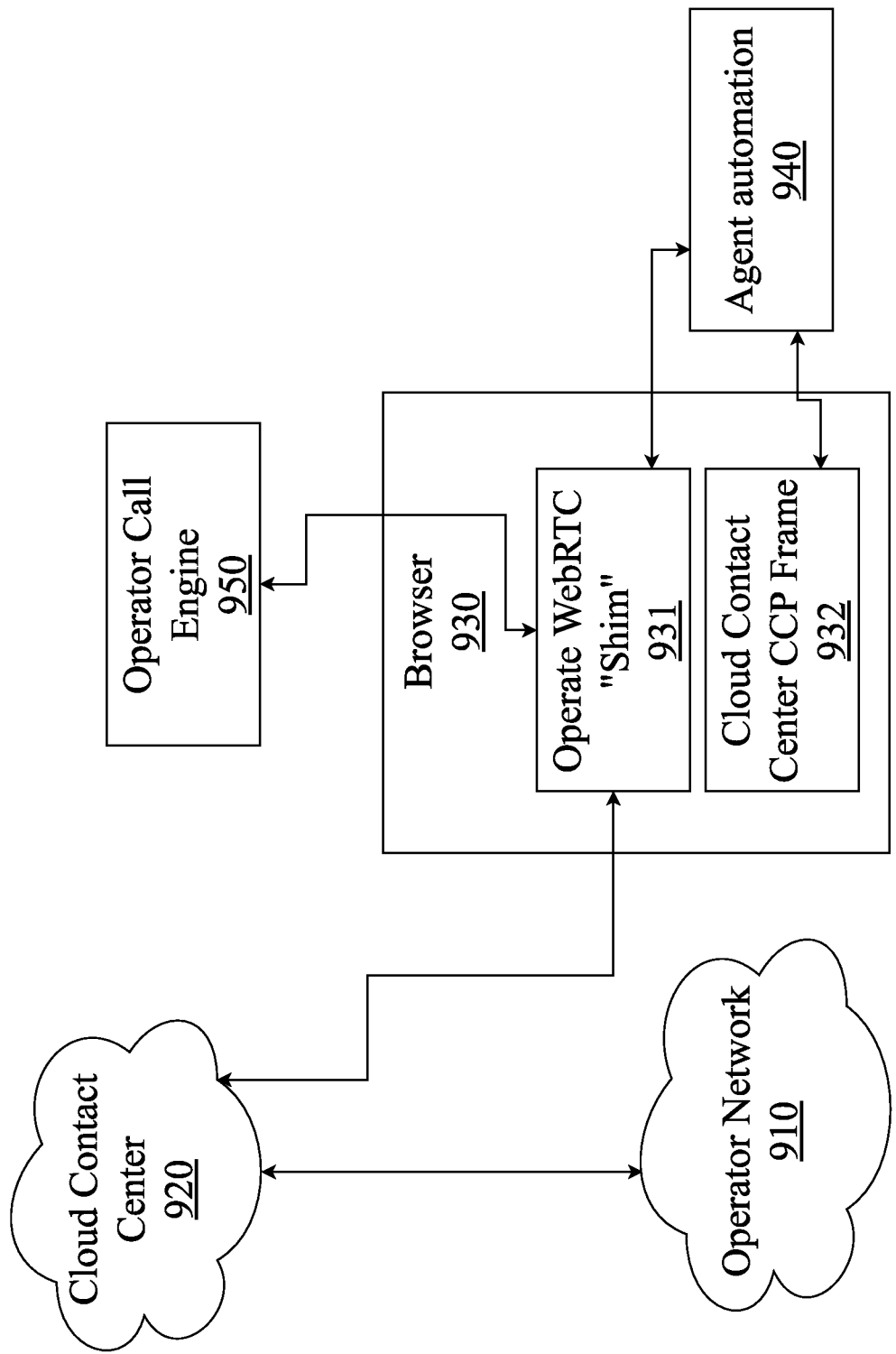
FIG. 9 is a system diagram illustrating components used in operating and testing real-time communications between web browsers with all server-side functions integrated into a call engine, according to an embodiment.

FIG. 9 is a system diagram illustrating components used in operating and testing real-time communications between web browsers with all server-side functions integrated into a call engine, according to an embodiment. A call and media testing operator network 910 connects over a network, or through direct connection, to a cloud contact center 920, such as over a TCP/IP connection, a UDP connection, or some other protocol of connection between devices and services. An operator network communicates with a cloud contact center to send and receive data on making calls to a cloud contact center service user for the purpose of testing and receiving the results of the testing of the infrastructure used by agents connected through the contact cloud center, and to test client-agent exchanges. A web browser 930 such as OPERA™, SAFARI™, MICROSOFT EDGE™, or others, also connects to a cloud contact center 920, through a network or through a direct connection, and may send and receive media data, with the use of a web-based contact center agent application 932, a WebRTC "shim" 931, and operator call engine 950 that may be used by an agent or synthetic agent, connected to over a network or with a direct connection, or operating as separate software on the same computing device. An operator call engine 950 that may be used by an agent or synthetic agent software may be responsible for receiving audio from an output source and taking it as input, for instance by simulating an audio output device like speakers or a headset, or by audio output device virtualization. A WebRTC "shim" is code injected by the agent automation 940 software in this embodiment, essentially acting as a separate piece of software that interacts with the web browser 930 to intercept signals coming from the cloud contact center 920 and provide custom or modular functionality, also taking the load off the browser, and instead putting it on the code operating outside the browser process, and the call engine 950, for processing media and call data separately from the browser process itself. An automated agent simulator or agent automation engine 940 also provides automated responses to simulate an agent or client or generally a "peer" in a peer-to-peer communication session, providing either a predetermined script of responses to another peer or by using a response tree, or through some other method such as with machine learning, to a web-based contact center agent application 932. An agent automation engine 940 may be operated over a network on a separate computing device, or may be operated on the same computer as the browser 930 that operates the web-based contact center agent application 932 and WebRTC shim 931.

Figure 10:
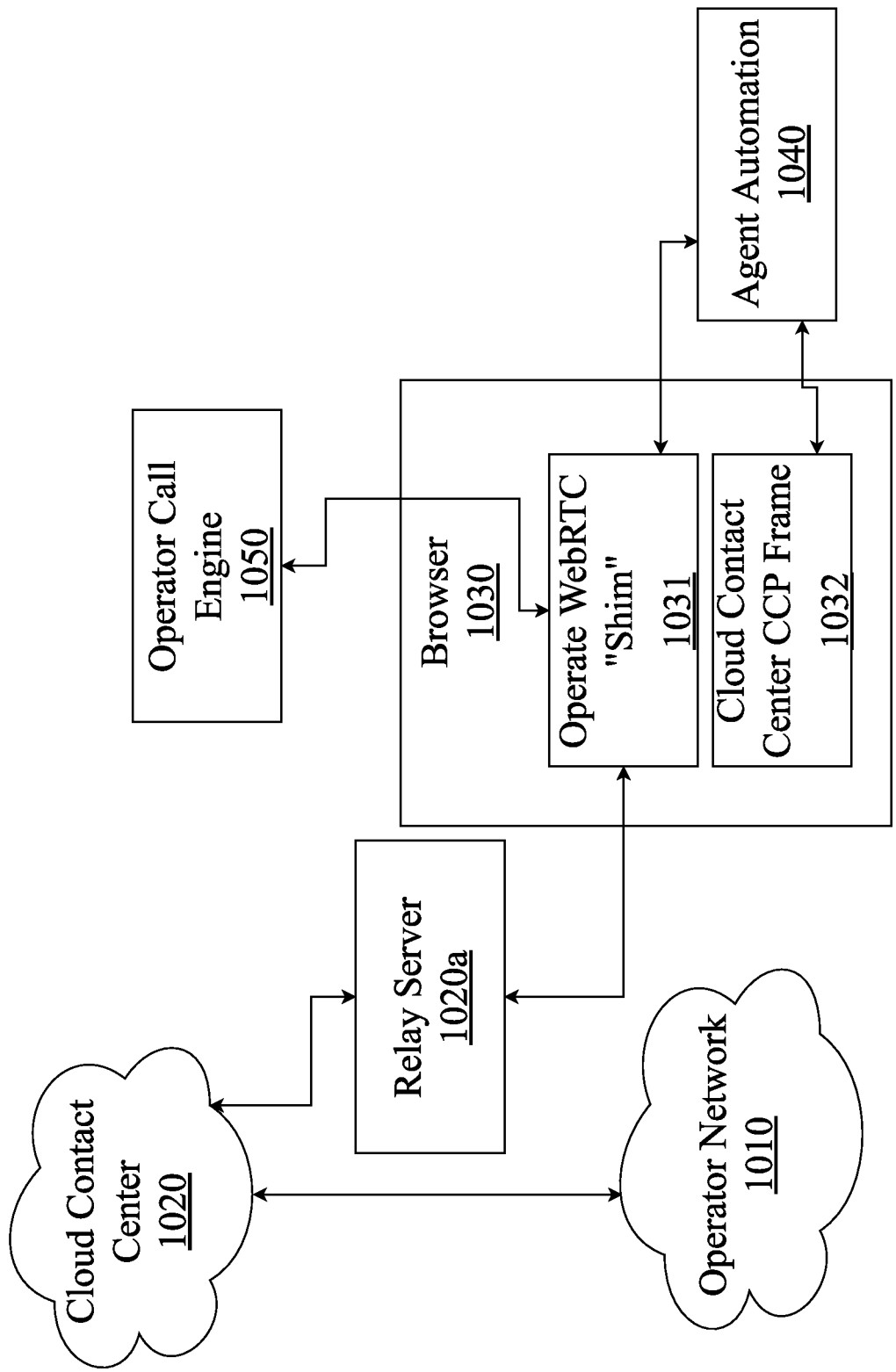
FIG. 10 is a system diagram illustrating components used in operating and testing real-time communications between web browsers with a custom TURN (Traversal Using Relays around NAT) server as a man-in-the-middle, according to an embodiment.

FIG. 10 is a system diagram illustrating components used in operating and testing real-time communications between web browsers with a custom TURN (Traversal Using Relays around NAT) server as a man-in-the-middle, according to an embodiment. A call and media testing operator network 1010 connects over a network, or through direct connection, to a cloud contact center 1020, such as over a TCP/IP connection, a UDP connection, or some other protocol of connection between devices and services. An operator network communicates with a cloud contact center to send and receive data on making calls to a cloud contact center service user for the purpose of testing and receiving the results of the testing of the infrastructure used by agents connected through the contact cloud center, and to test client-agent exchanges. A relay server 1020a, such as a Traversal Using Relays around NAT ("TURN") server, serves as a relay between the cloud contact center and a web browser 1030 such as OPERA™, SAFARI™, MICROSOFT EDGE™, or others, serving to aid in connecting a user behind a NAT to the cloud contact center 1020, through a network or through a direct connection, and may send and receive media data, with the use of a web-based contact center agent application 1032, a WebRTC "shim" 1031, and call engine software 1050 connected to over a network or with a direct connection, or operating as separate software on the same computing device. A operator call engine 1050 that may be used by an agent or synthetic agent software, may be responsible for receiving audio from an output source and taking it as input, for instance by simulating an audio output device like speakers or a headset, or by audio output device virtualization. A WebRTC "shim" is code injected by the agent automation 1040 software in this embodiment, essentially acting as a separate piece of software that interacts with the web browser 1030 to intercept signals coming from the cloud contact center 1020 and provide custom or modular functionality, also taking the load off the browser, and instead putting it on the code operating outside the browser process, and the call engine 1050, for processing media and call data separately from the browser process itself. An automated agent simulator or agent automation engine 1040 also provides automated responses to simulate an agent or client or generally a "peer" in a peer-to-peer communication session, providing either a predetermined script of responses to another peer or by using a response tree, or through some other method such as with machine learning, to a web-based contact center agent application 1032. An agent automation engine 1040 may be operated over a network on a separate computing device, or may be operated on the same computer as the browser 1030 that operates the web-based contact center agent application 1032 and WebRTC shim 1031.

Figure 11:
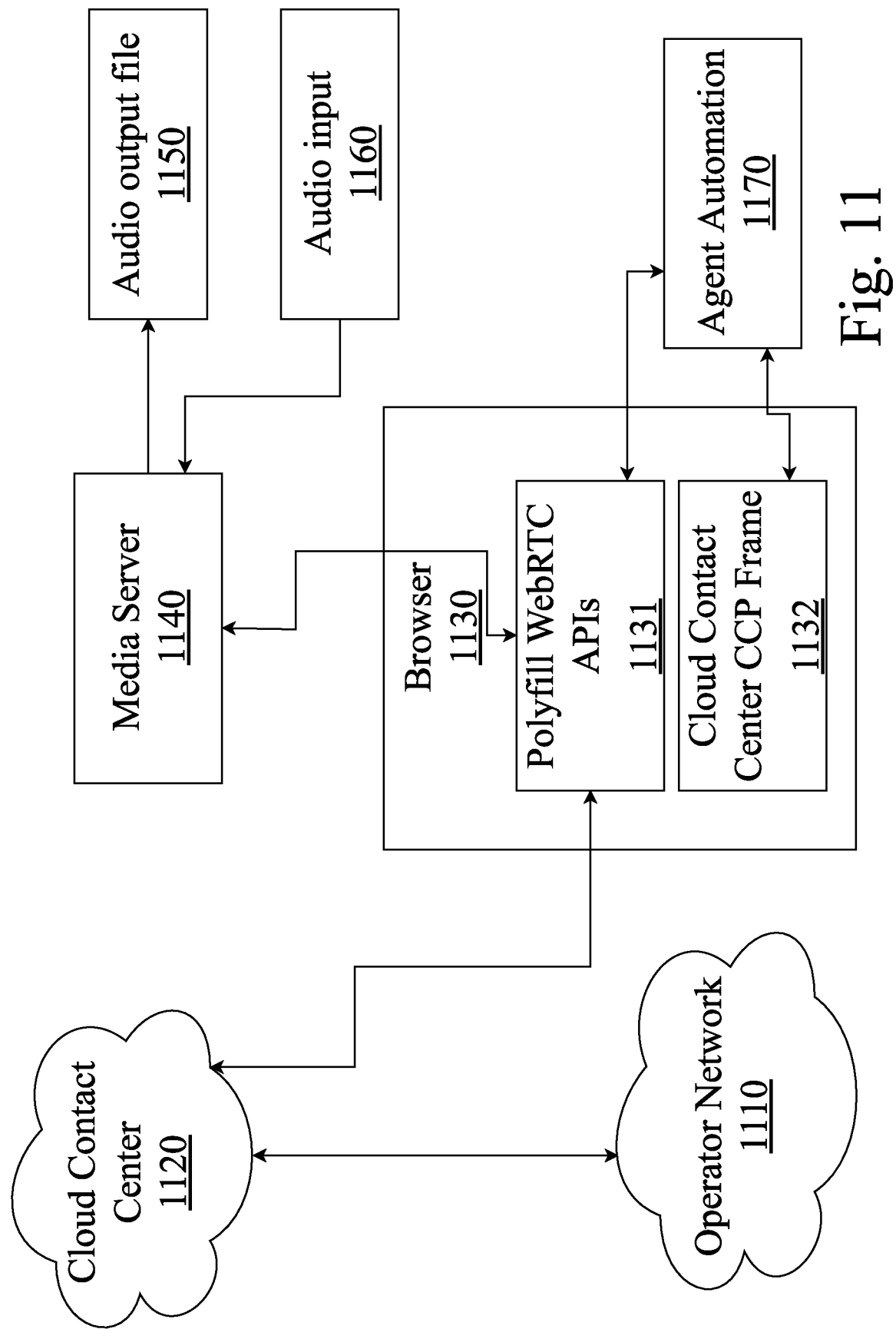
FIG. 11 is a system diagram illustrating components used in operating and testing real-time communications between web browsers using a polyfill technique to implement WebRTC APIs with a custom implementation that bypass a browser's media and negotiates with an external media server, according to an embodiment.

FIG. 11 is a system diagram illustrating components used in operating and testing real-time communications between web browsers using a polyfill technique to implement WebRTC APIs with a custom implementation that bypasses a browser's media and negotiates with an external media server, according to an embodiment. A call and media testing operator network 1110 connects over a network, or through direct connection, to a cloud contact center 1120, such as over a TCP/IP connection, a UDP connection, or some other protocol of connection between devices and services. The operator network 1110 communicates with a cloud contact center to send and receive data on making calls to a cloud contact center service user for the purpose of testing and receiving the results of the testing of the infrastructure used by agents connected through the contact cloud center, and to test client-agent exchanges. A web browser 1130 such as OPERA™, SAFARI™, MICROSOFT EDGE™, or others, also connects to a cloud contact center 1120, through a network or through a direct connection, and may send and receive media data, with the use of a web-based contact center agent application 1132, a polyfill of WebRTC APIs 1131, and media server software 1140. A polyfill of WebRTC APIs 1131 in this case provides a means to override built in WebRTC APIs to allow for the interception of signaling information to allow RTC media to be directed outside of the browser itself. Media server 1140 software is capable of processing audio and video data, encoding and decoding it, providing basic encryption and decryption services for the media data, operating audio and video enhancement software or algorithms such as anti-jitter software, and more. A polyfill of WebRTC APIs may act in some embodiments as a separate piece of software that interacts with the web browser 1130 to intercept signals coming from the cloud contact center 1120 and provide custom or modular functionality, also taking the load off the browser, and instead putting it on the code operating outside the browser process, and the media server 1140, for processing media data separately from the browser itself. An automated agent simulator or agent automation engine 1170 also provides automated responses to simulate an agent or client or generally a "peer" in a peer-to-peer communication session, providing either a predetermined script of responses to another peer or by using a response tree, or through some other method such as with machine learning, to a web-based contact center agent application 1131. An agent automation engine 1170 may be operated over a network on a separate computing device, or may be operated on the same computer as the browser 1130 that operates the web-based contact center agent application 1131 and WebRTC polyfill 1131. Audio output may be discarded or saved as a file 1150, while audio input 1160 may be a set of audio data to simulate with a media server software package such as KURENTO™.

Figure 12:
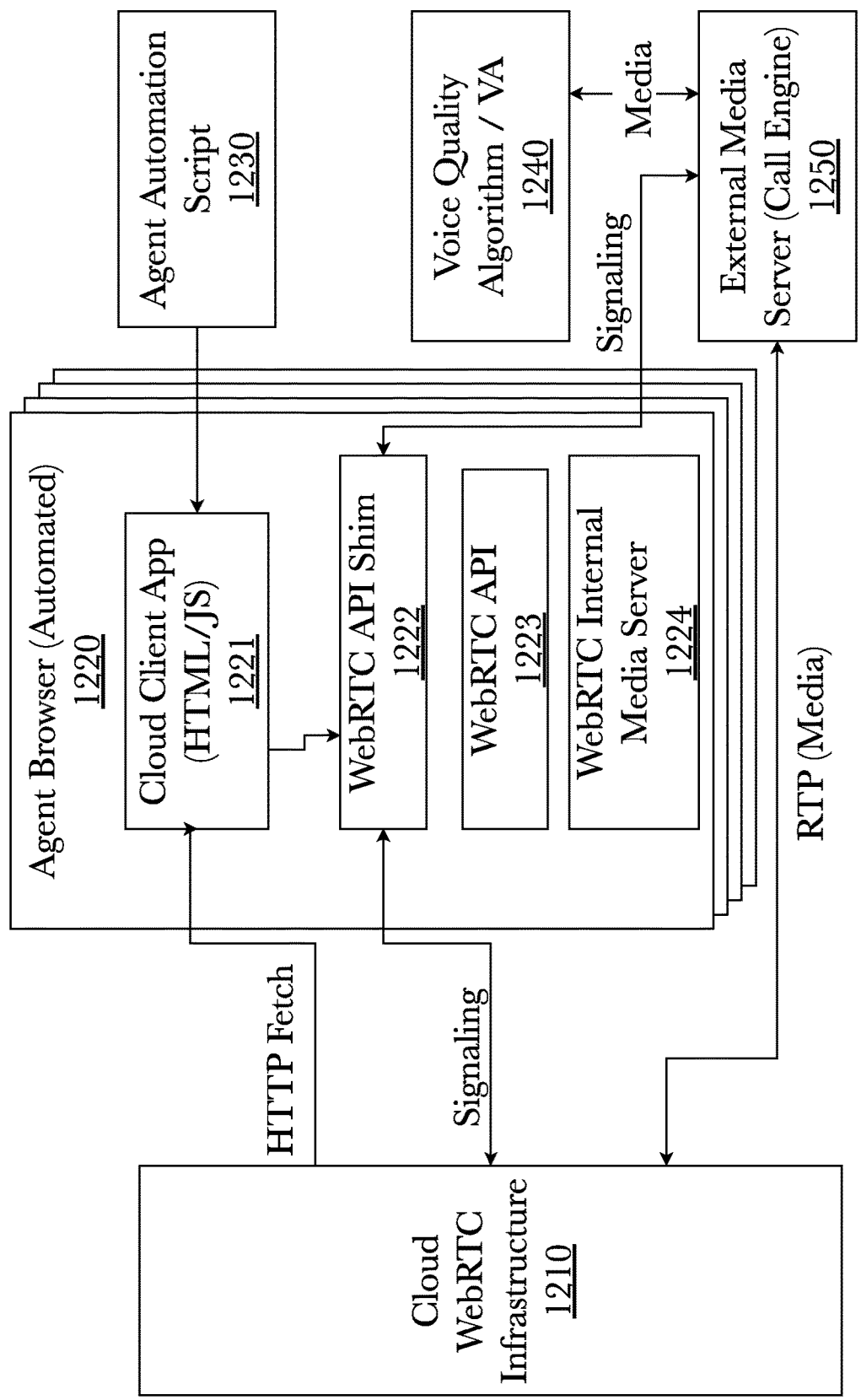
FIG. 12 is a system diagram illustrating an API shim intercepting WebRTC API calls and enabling interactions between a cloud infrastructure or contact center, and an external media engine, with custom functionality in an agent browser, according to an embodiment.

FIG. 12 is a system diagram illustrating an API shim intercepting WebRTC API calls and enabling interactions between a cloud infrastructure or contact center, and an external media engine, with custom functionality in an agent browser, according to an embodiment. A cloud WebRTC infrastructure 1210 such as but not limited to AMAZON CONNECT™ may communicate and operate with an automated agent browser 1220, such as but not limited to the AMAZON CONNECT™ contact control panel (CCP), which normally implements a WebRTC API 1223 and internal media server 1224 to handle media exchange between an agent and customer using the cloud infrastructure to interface between them. In this embodiment, the API 1223 and internal media server 1224 are bypassed due to a polyfill API shim 1222 which operates in the automated agent browser 1220, and intercepts the API calls from the application 1221 itself and handle signaling between the agent browser 1220 and the cloud infrastructure 1210. This API shim 1222 then communicates the signaling data to an external media server 1250 which then uses the signaling information to communicate real time communications protocol ("RTP") media with the cloud infrastructure, such as voice and video data, with a virtual agent or voice quality detection algorithm 1240 for automated testing and virtual agent operation through the use of an agent automation script 1230 to drive the client and make the API calls required to interact with a user on the other side of the cloud infrastructure.

Figure 13:
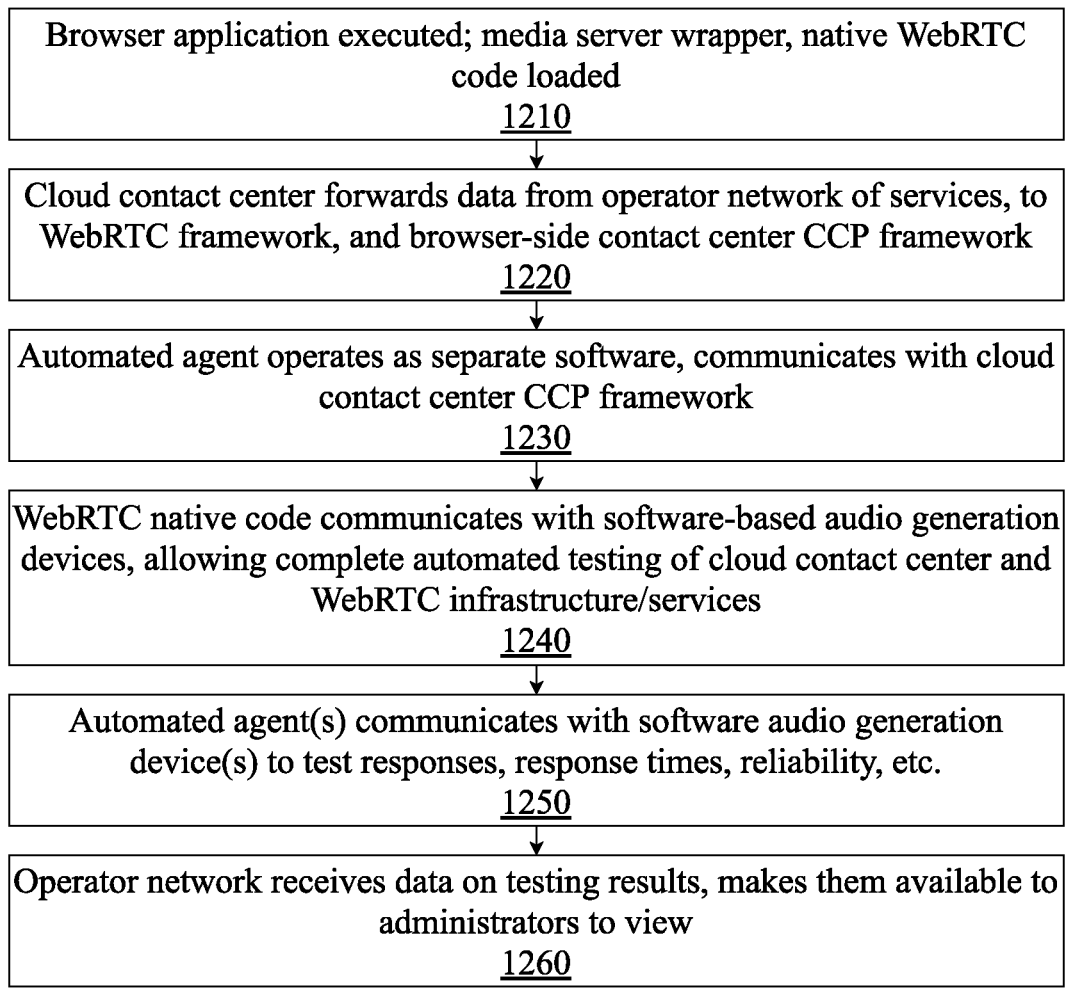
FIG. 13 is a method diagram illustrating steps in operating and testing real-time communications between web browsers with a dedicated desktop application, according to an embodiment.

FIG. 13 is a method diagram illustrating steps in operating and testing real-time communications between web browsers with a dedicated desktop application, according to an embodiment. A browser application is executed on a computing device, such as OPERA™, SAFARI™, CHROME™, or other browsers available, loading a media server wrapper and native WebRTC code 1210 into memory. A media server wrapper may also be called a media server plugin, or a separate piece of software that communicates with the web browser and WebRTC code. An operator network that initiates tests of peer-to-peer communications then may forward data through a cloud contact center such as AMAZON CONNECT™, to a browser operating a WebRTC framework and browser-side contact center web-based contact center agent application 1220 for cloud contact center integration. An agent automation engine may then operate as either a simple test of media communication connection, or as a complex test of other automated systems such as browser-based IVR's 1230, while WebRTC native code may communicate with software audio generation devices, allowing automated testing of cloud contact center and WebRTC infrastructure/services 1240. The automated agent or agents (depending on the implementation) may then communicate either directly, over a network, or with the web browser process on the same computing device, and with software audio generation device(s) to test responses, response times, reliability, and any other metrics or functionality desired to be tested by the operating network 1250. The test results may then be forwarded to the operator services network by either controlling the call or calls directly through the cloud contact center, or by being sent the results of the tests over a network 1260.

Figure 14:
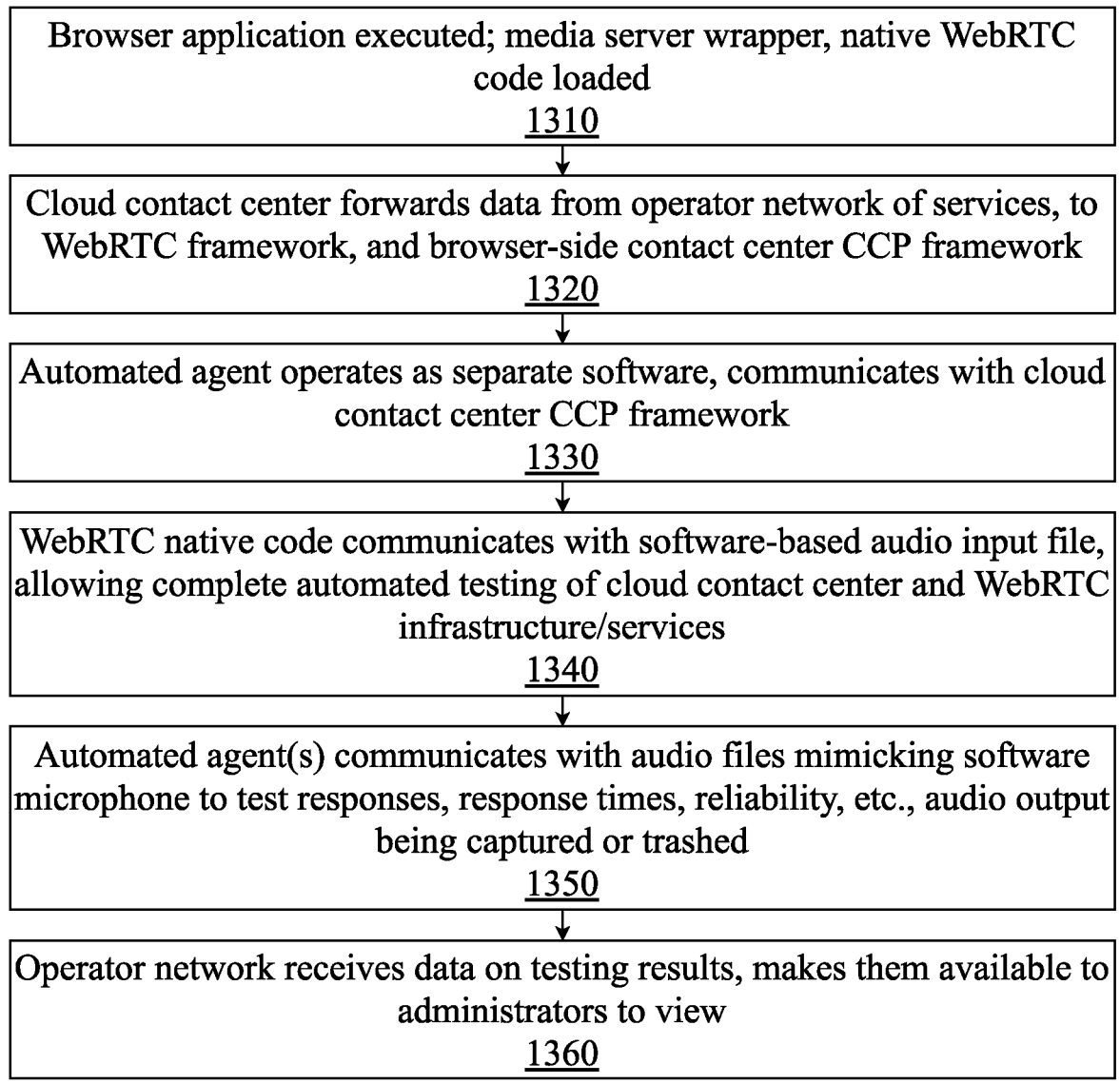
FIG. 14 is a method diagram illustrating steps in operating and testing real-time communications between web browsers without a dedicated desktop application, according to an embodiment.

FIG. 14 is a method diagram illustrating steps in operating and testing real-time communications between web browsers without a dedicated desktop application, according to an embodiment. A browser application is executed on a computing device, such as OPERA™, SAFARI™, CHROME™, or other browsers available, loading a media server wrapper and native WebRTC code 1310 into memory. A media server wrapper may also be called a media server plugin, or a separate piece of software that communicates with the web browser and WebRTC code. An operator network that initiates tests of peer-to-peer communications then may forward data through a cloud contact center such as AMAZON CONNECT™, to a browser operating a WebRTC framework and browser-side contact center web-based contact center agent application 1320 for cloud contact center integration. An agent automation engine may then operate as either a simple test of media communication connection, or as a complex test of other automated systems such as browser-based IVR's 1330, while WebRTC native code may communicate with a digital audio file or other audio stream, allowing automated testing of cloud contact center and WebRTC infrastructure/services 1340. Audio files may be prepared in advance or generated programmatically depending on the implementation of the WebRTC APIs. The automated agent or agents (depending on the implementation) may then communicate either directly, over a network, or with the web browser process on the same computing device, with audio files that mimic a software microphone or other audio stream to test responses, response times, reliability, and any other metrics or functionality desired to be tested by the operating network 1350, the audio output being able to be captured and analyzed, discarded and deleted, or may be ignored and handled in some alternative manner, as desired depending on the programming. The test results may then be forwarded to the operator services network by either controlling the call or calls directly through the cloud contact center, or by being sent the results of the tests over a network 1360.

Figure 15:
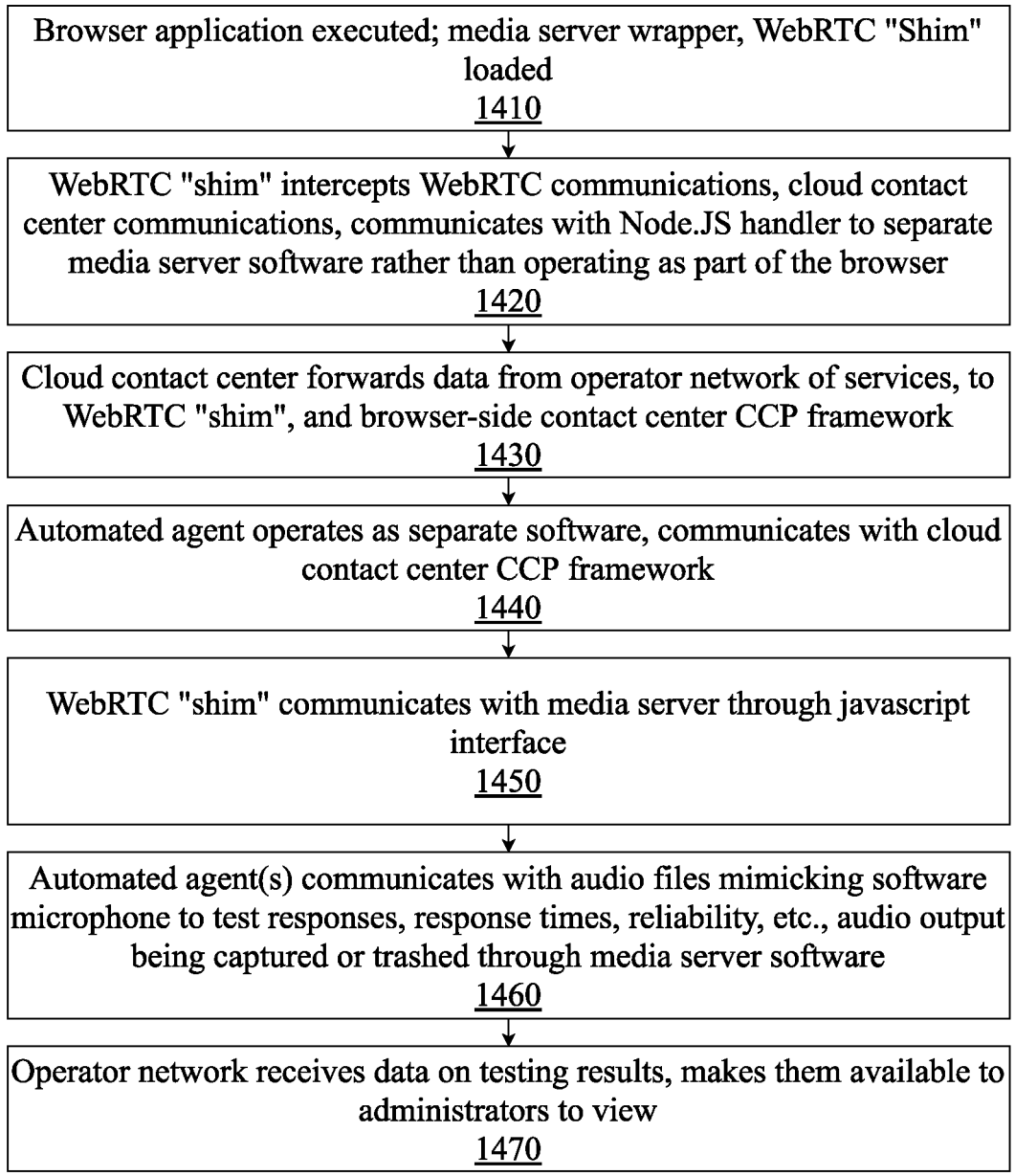
FIG. 15 is a method diagram illustrating steps in operating and testing real-time communications between web browsers using a cloud contact center such as AMAZONCONNECT™, according to an embodiment.

FIG. 15 is a method diagram illustrating steps in operating and testing real-time communications between web browsers using a cloud contact center such as AMAZONCONNECT™, according to an embodiment. A browser application is executed on a computing device, such as OPERA™, SAFARI™, CHROME™, or other browsers available, loading a media server wrapper and a WebRTC "shim" 1410 into memory. A "shim" in computer programming refers to a library or set of functions or methods that intercept API calls to perform one or multiple of several possible actions on the API calls, including altering the arguments passed in the call, handling the operation itself rather than allowing the intended destination to, or redirecting it elsewhere. In this case, a WebRTC shim refers to an injected piece of code that acts similarly to WebRTC APIs in the browser but are not tied to the browser process and may behave differently and scale better than native WebRTC code running in a browser. A media server wrapper may also be called a media server plugin, or a separate piece of software that communicates with the web browser and WebRTC code. A WebRTC shim may intercept WebRTC API calls and other cloud contact center communications, as well as manage communications between the browser and a media server with a JavaScript handler such as one made with NODE.JS™ NODE.JS™ to separate the media server software rather than operating as part of the browser 1420. The media server may be operated on a different computing device, or the same computing device, and may be connected to over a network. An operator network that initiates tests of peer-to-peer communications then may forward data through a cloud contact center such as AMAZON CONNECT™, to a browser operating a WebRTC shim and browser-side contact center web-based contact center agent application 1430 for cloud contact center integration. An agent automation engine may then operate as either a simple test of media communication connection, or as a complex test of other automated systems such as browser-based IVR's 1440, while a WebRTC shim communicates with a media server through a javascript interface such as an interface coded in NODE.JS™ 1450. The media server handles a connection between audio files that may be used for input and output of the test audio. Audio files may be prepared in advance or generated programmatically depending on the implementation of the shimmed APIs. The automated agent or agents (depending on the implementation) may then communicate either directly, over a network, or with the web browser process on the same computing device, with audio files that mimic a software microphone or other audio stream to test responses, response times, reliability, and any other metrics or functionality desired to be tested by the operating network 1460, the audio output being able to be captured or captured and analyzed, discarded and deleted, or may be ignored and handled in some alternative manner, as desired depending on the programming, by the media server. The test results may then be forwarded to the operator services network by either controlling the call or calls directly through the cloud contact center, or by being sent the results of the tests over a network 1470.

Figure 16:
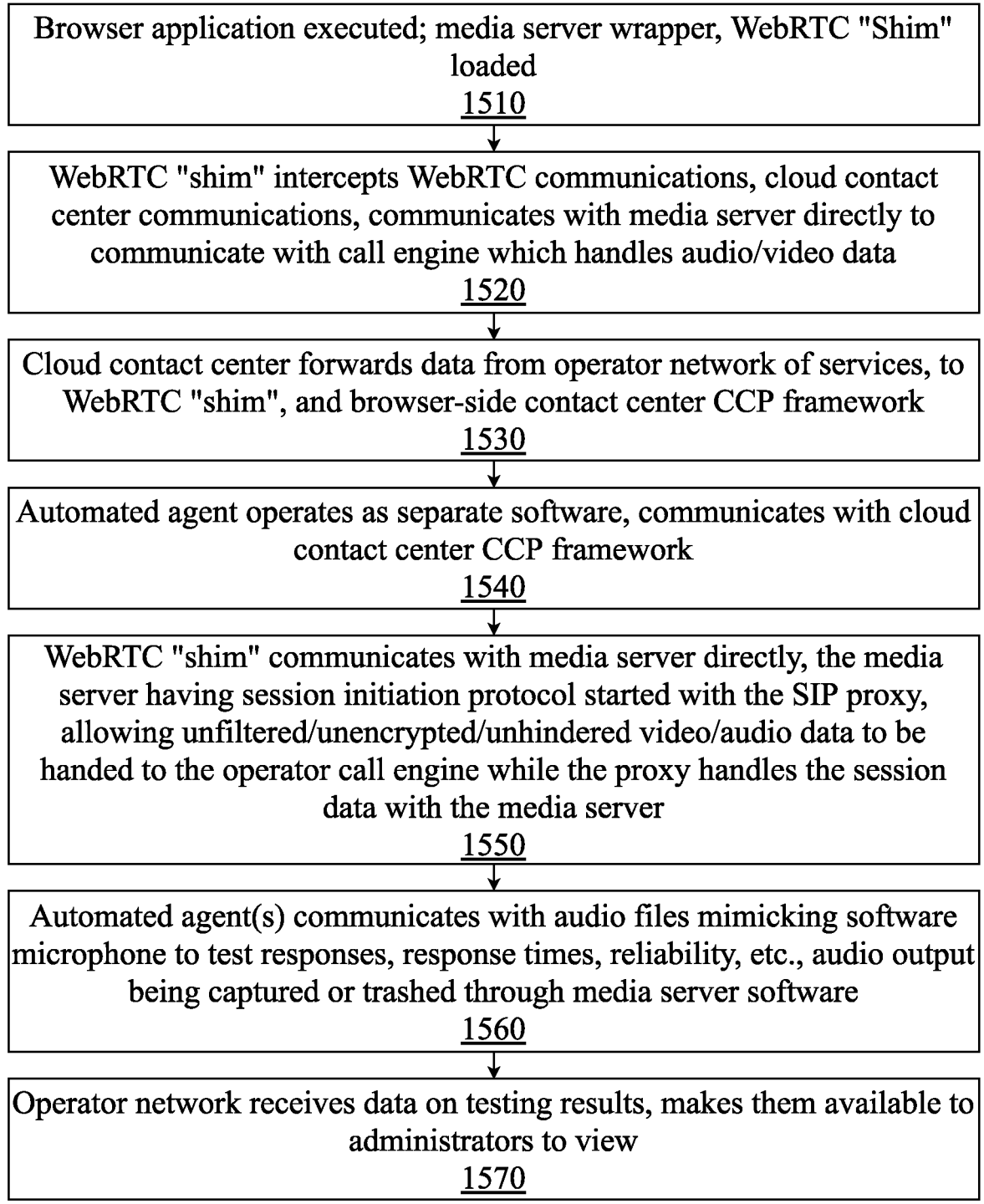
FIG. 16 is a method diagram illustrating steps in operating and testing real-time communications between web browsers using a media server as a proxy for a call engine, according to an embodiment.

FIG. 16 is a method diagram illustrating steps in operating and testing real-time communications between web browsers using a media server as a proxy for a call engine, according to an embodiment. A browser application is executed on a computing device, such as OPERA™, SAFARI™, CHROME™, or other browsers available, loading a media server wrapper and a WebRTC "shim" 1510 into memory. A "shim" in computer programming refers to a library or set of functions or methods that intercept API calls to perform one or multiple of several possible actions on the API calls, including altering the arguments passed in the call, handling the operation itself rather than allowing the intended destination to, or redirecting it elsewhere. In this case, a WebRTC shim refers to an injected piece of code that acts similarly to WebRTC APIs in the browser but are not tied to the browser process and may behave differently and scale better than native WebRTC code running in a browser. A media server wrapper may also be called a media server plugin, or a separate piece of software that communicates with the web browser and WebRTC code. A WebRTC shim may intercept WebRTC API calls and other cloud contact center communications, as well as manage communications between the browser and a media server to separate the media server software rather than operating as part of the browser 1520. The media server may be operated on a different computing device, or the same computing device, and may be connected to over a network. An operator network that initiates tests of peer-to-peer communications then may forward data through a cloud contact center such as AMAZON CONNECT™, to a browser operating a WebRTC shim and browser-side contact center web-based contact center agent application 1530 for cloud contact center integration. An agent automation engine may then operate as either a simple test of media communication connection, or as a complex test of other automated systems such as browser-based IVR's 1540, while a WebRTC shim communicates with the media server directly, the media server having session initiation protocol started with the SIP proxy, allowing unfiltered/unencrypted/unhindered video/audio data to be handed to an operator call engine while the proxy handles the session data with the media server 1550. A call engine may process and generate unencrypted Real-Time Transport Protocol ("RTP") media for the purpose of driving the actual generation of and processing of audio, and has access to the unencrypted RTP stream of media due to the use of an SIP proxy that handles the signaling data for the RTP transmission. The media server handles a connection between audio files that may be used for input and output of the test audio. Audio files may be prepared in advance or generated programmatically depending on the implementation of the shimmed APIs. The automated agent or agents (depending on the implementation) may then communicate either directly, over a network, or with the web browser process on the same computing device, with audio files that mimic a software microphone or other audio stream to test responses, response times, reliability, and any other metrics or functionality desired to be tested by the operating network 1560, the audio output being able to be captured or captured and analyzed, discarded and deleted, or may be ignored and handled in some alternative manner, as desired depending on the programming, by the media server. The test results may then be forwarded to the operator services network by either controlling the call or calls directly through the cloud contact center, or by being sent the results of the tests over a network 1570.

Figure 17:
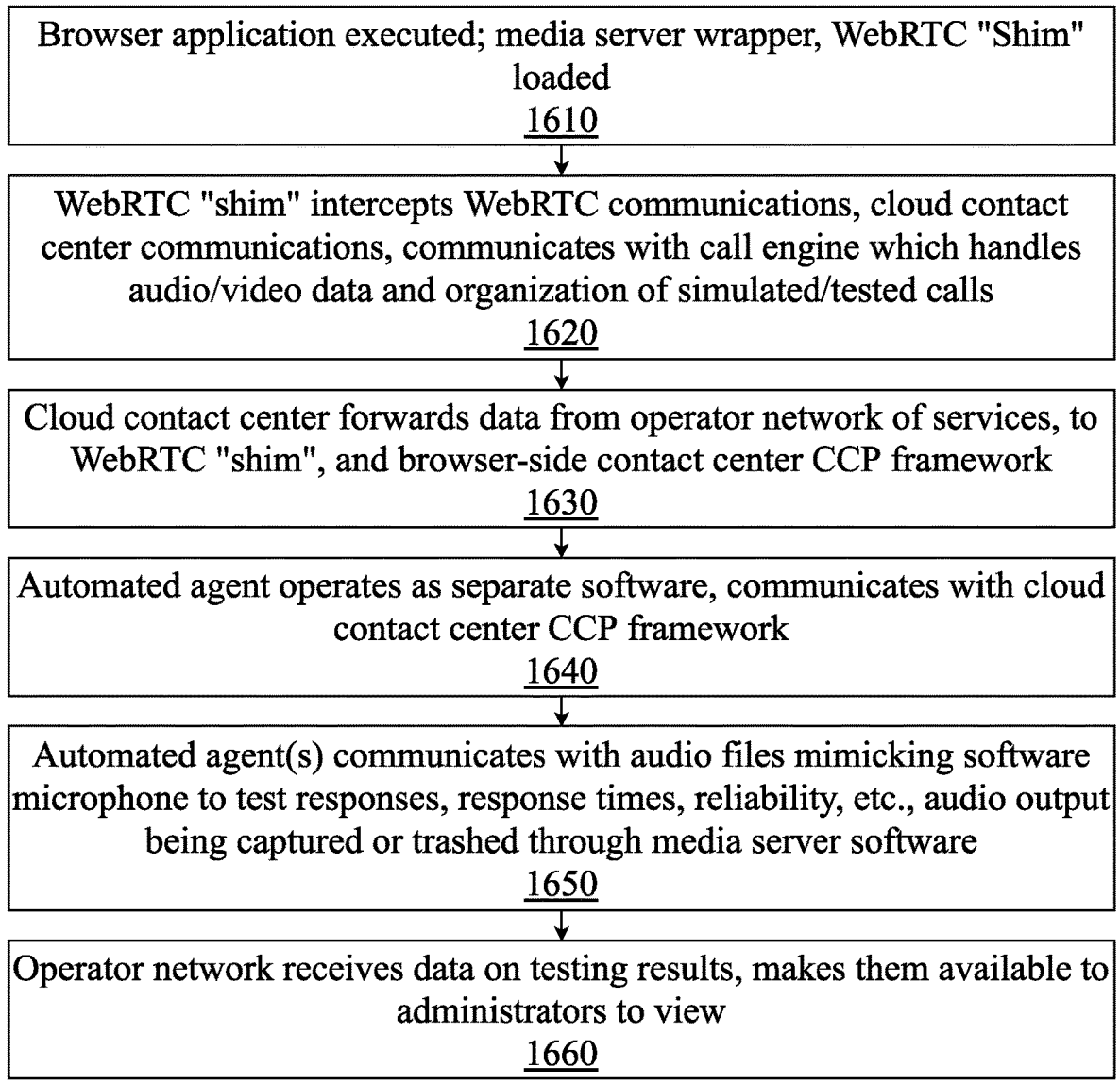
FIG. 17 is a method diagram illustrating steps in operating and testing real-time communications between web browsers with all server-side functions integrated into a call engine, according to an embodiment.

FIG. 17 is a method diagram illustrating steps in operating and testing real-time communications between web browsers with all server-side functions integrated into a call engine, according to an embodiment. A browser application is executed on a computing device, such as OPERA™, SAFARI™, CHROME™, or other browsers available, loading a WebRTC "shim" 1610 into memory. A "shim" in computer programming refers to a library or set of functions or methods that intercept API calls to perform one or multiple of several possible actions on the API calls, including altering the arguments passed in the call, handling the operation itself rather than allowing the intended destination to, or redirecting it elsewhere. In this case, a WebRTC shim refers to an injected piece of code that acts similarly to WebRTC APIs in the browser but are not tied to the browser process and may behave differently and scale better than native WebRTC code running in a browser. A WebRTC shim may intercept WebRTC API calls and other cloud contact center communications, as well as manage communications between the browser and a call engine to separate the call engine software rather than operating as part of the browser 1620. A call engine may process and generate unencrypted Real-Time Transport Protocol ("RTP") media for the purpose of driving the actual generation of and processing of audio, and in this embodiment does not require an SIP proxy server but can operate with WebRTC signal data processing itself. An operator network that initiates tests of peer-to-peer communications then may forward data through a cloud contact center such as AMAZON CONNECT™, to a browser operating a WebRTC framework and browser-side contact center web-based contact center agent application 1630 for cloud contact center integration. An agent automation engine may then operate as either a simple test of media communication connection, or as a complex test of other automated systems such as browser-based IVR's 1640, while WebRTC native code may communicate with a digital audio file or other audio stream, allowing automated testing of cloud contact center and WebRTC infrastructure/services 1650. Audio files may be prepared in advance or generated programmatically depending on the implementation of the WebRTC APIs. The automated agent or agents (depending on the implementation) may then communicate either directly, over a network, or with the web browser process on the same computing device, with audio files that mimic a software microphone or other audio stream to test responses, response times, reliability, and any other metrics or functionality desired to be tested by the operating network 1660, the audio output being able to be captured or captured and analyzed, discarded and deleted, or may be ignored and handled in some alternative manner, as desired depending on the programming. The test results may then be forwarded to the operator services network by either controlling the call or calls directly through the cloud contact center, or by being sent the results of the tests over a network 1670.

Figure 18:
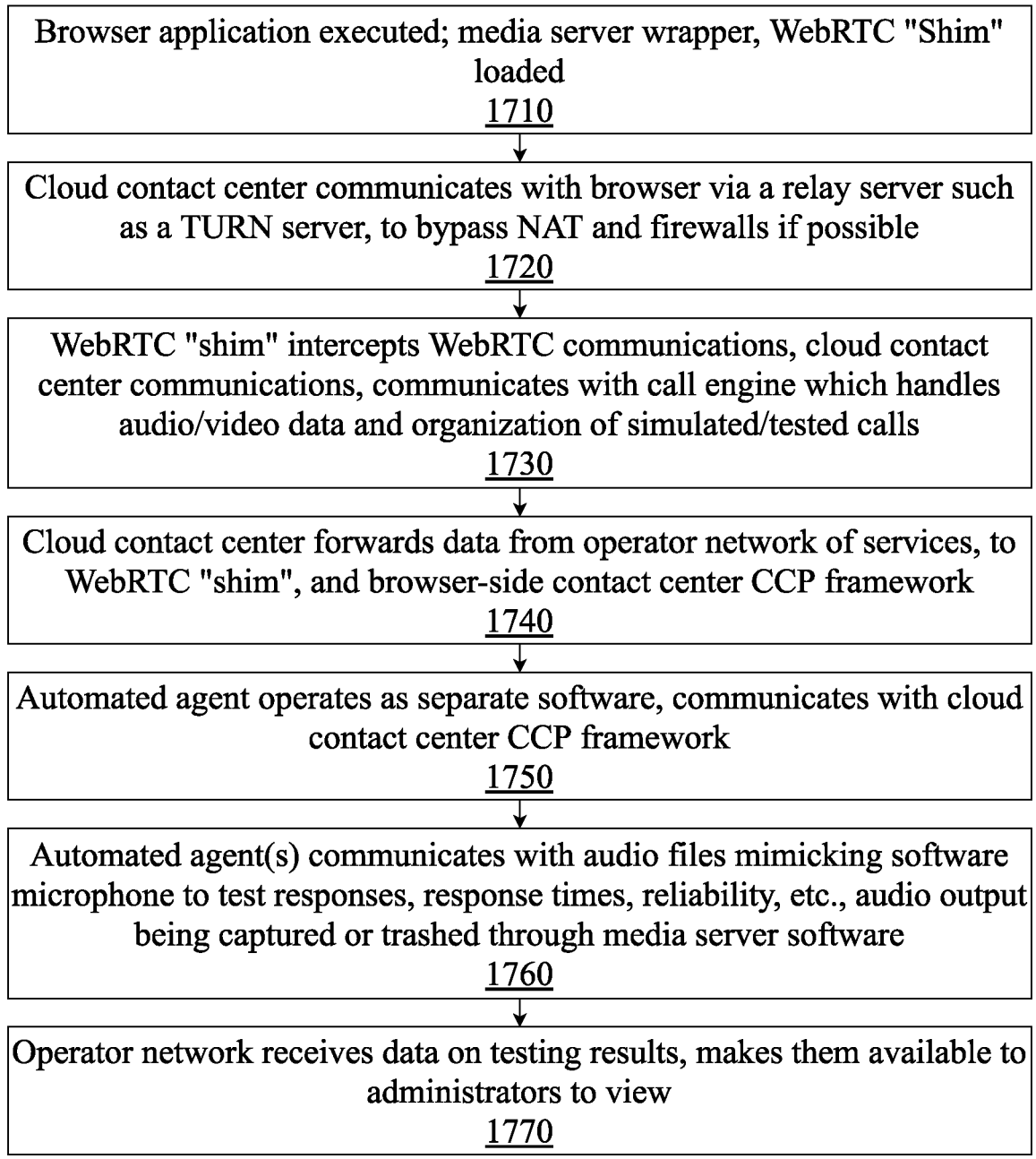
FIG. 18 is a method diagram illustrating steps in operating and testing real-time communications between web browsers with a custom TURN (Traversal Using Relays around NAT) server as a man-in-the-middle, according to an embodiment.

FIG. 18 is a method diagram illustrating steps in operating and testing real-time communications between web browsers with a custom TURN (Traversal Using Relays around NAT) server as a man-in-the-middle, according to an embodiment. A browser application is executed on a computing device, such as OPERA™, SAFARI™, CHROME™, or other browsers available, loading a WebRTC "shim" 1710 into memory. A "shim" in computer programming refers to a library or set of functions or methods that intercept API calls to perform one or multiple of several possible actions on the API calls, including altering the arguments passed in the call, handling the operation itself rather than allowing the intended destination to, or redirecting it elsewhere. In this case, a WebRTC shim refers to an injected piece of code that acts similarly to WebRTC APIs in the browser but are not tied to the browser process and may behave differently and scale better than native WebRTC code running in a browser. Cloud contact center communications with the browser are sent to a relay server such as a TURN server first, to bypass NAT such as those provided by firewalls or local routers, if possible 1720. A WebRTC shim may intercept WebRTC API calls and other cloud contact center communications, as well as manage communications between the browser and a call engine to separate the call engine software rather than operating as part of the browser 1730. A call engine may process and generate unencrypted Real-Time Transport Protocol ("RTP") media for the purpose of driving the actual generation of and processing of audio, and in this embodiment does not require an SIP proxy server but can operate with WebRTC signal data processing itself. An operator network that initiates tests of peer-to-peer communications then may forward data through a cloud contact center such as AMAZON CONNECT™, to a browser operating a WebRTC shim and browser-side contact center web-based contact center agent application 1740 for cloud contact center integration.

An agent automation engine may then operate as either a simple test of media communication connection, or as a complex test of other automated systems such as browser-based IVR's 1750. Audio files may be prepared in advance or generated programmatically depending on the implementation of the shimmed APIs. The automated agent or agents (depending on the implementation) may then communicate either directly, over a network, or with the web browser process on the same computing device, with audio files that mimic a software microphone or other audio stream to test responses, response times, reliability, and any other metrics or functionality desired to be tested by the operating network 1760, the audio output being able to be captured or captured and analyzed, discarded and deleted, or may be ignored and handled in some alternative manner, as desired depending on the programming of the call engine, if audio files are used. The test results may then be forwarded to the operator services network by either controlling the call or calls directly through the cloud contact center, or by being sent the results of the tests over a network 1770.

Figure 19:
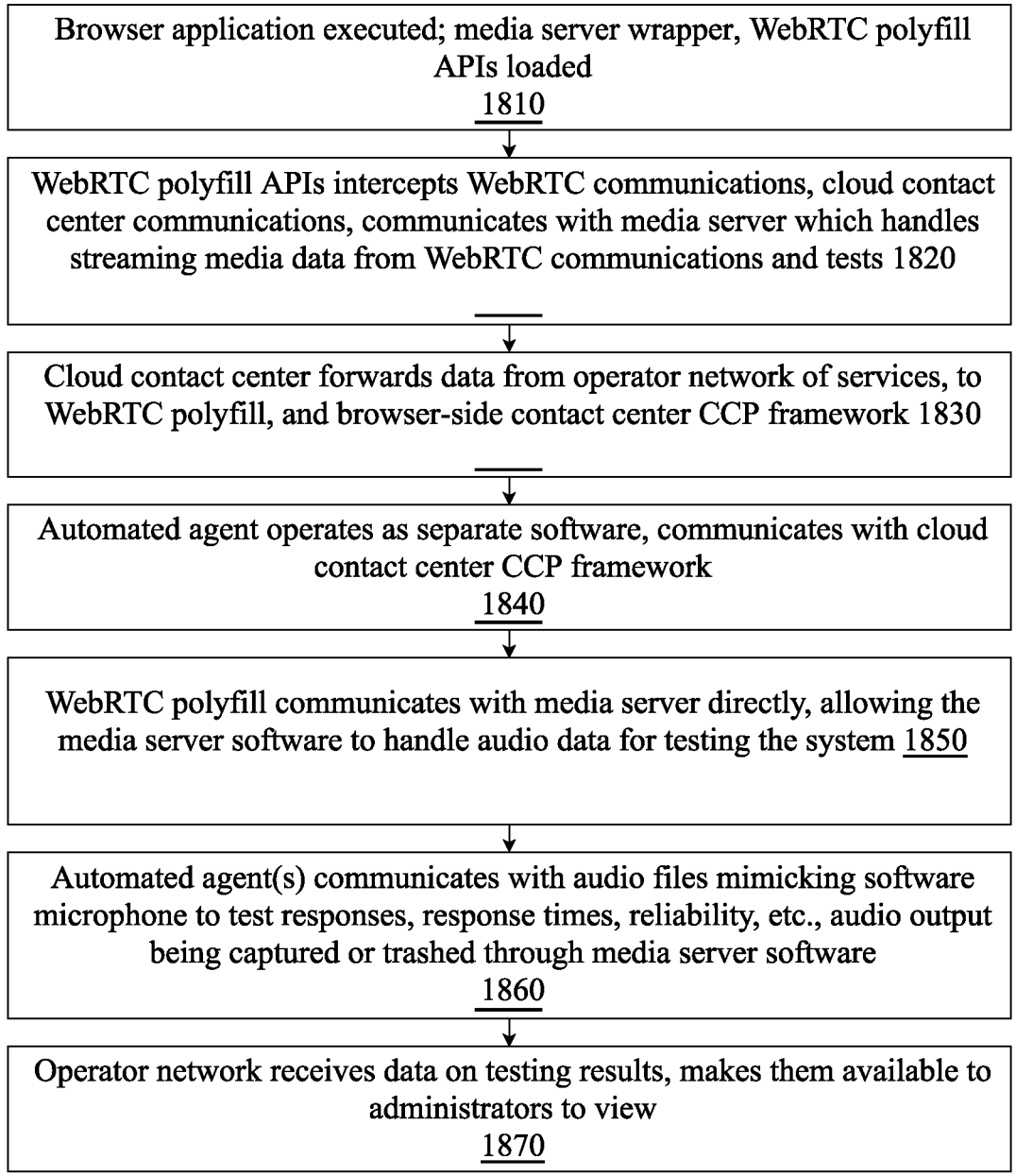
FIG. 19 is a method diagram illustrating steps in operating and testing real-time communications between web browsers using a polyfill technique to implement WebRTC APIs with a custom implementation that bypass a browser's media and negotiates with an external media server, according to an embodiment.

FIG. 19 is a method diagram illustrating steps in operating and testing real-time communications between web browsers using a polyfill technique to implement WebRTC APIs with a custom implementation that bypass a browser's media and negotiates with an external media server, according to an embodiment. A browser application is executed on a computing device, such as OPERA™, SAFARI™, CHROME™, or other browsers available, loading a media server wrapper and a WebRTC polyfill 1810 into memory. A polyfill in computer programming refers to a library or set of functions or methods that intercept API calls to perform one or multiple of several possible actions on the API calls, including altering the arguments passed in the call, handling the operation itself rather than allowing the intended destination to, or redirecting it elsewhere. In this case, a WebRTC polyfill refers to an injected piece of code that acts similarly to WebRTC APIs in the browser but are not tied to the browser process and may behave differently and scale better than native WebRTC code running in a browser. A media server wrapper may also be called a media server plugin, or a separate piece of software that communicates with the web browser and WebRTC code. A WebRTC polyfill may intercept WebRTC API calls and other cloud contact center communications, as well as manage communications between the browser and a media server to separate the media server software rather than operating as part of the browser 1820. The media server may be operated on a different computing device, or the same computing device, and may be connected to over a network. An operator network that initiates tests of peer-to-peer communications then may forward data through a cloud contact center such as AMAZON CONNECT™, to a browser operating a WebRTC polyfill and browser-side contact center web-based contact center agent application 1830 for cloud contact center integration. An agent automation engine may then operate as either a simple test of media communication connection, or as a complex test of other automated systems such as browser-based IVR's 1840, while a WebRTC polyfill communicates with the media server directly 1850. A call engine may process and generate unencrypted Real-Time Transport Protocol ("RTP") media for the purpose of driving the actual generation of and processing of audio, signaling data for SIP being proxied through the polyfill. The media server handles a connection between audio files that may be used for input and output of the test audio. Audio files may be prepared in advance or generated programmatically depending on the implementation of the polyfill APIs. The automated agent or agents (depending on the implementation) may then communicate either directly, over a network, or with the web browser process on the same computing device, with audio files that mimic a software microphone or other audio stream to test responses, response times, reliability, and any other metrics or functionality desired to be tested by the operating network 1860, the audio output being able to be captured or captured and analyzed, discarded and deleted, or may be ignored and handled in some alternative manner, as desired depending on the programming, by the media server. The test results may then be forwarded to the operator services network by either controlling the call or calls directly through the cloud contact center, or by being sent the results of the tests over a network 1870.

Voice quality testing may be performed when audio captured at either end of a conversation can be compared with the initially transmitted audio. In order to perform this comparison, it is necessary to be able control audio that is input on each applicable end of the conversation. An existing call engine allows for input and capture of audio at the customer end of the conversation via legacy methods (including SIP, H.323, and PSTN). However, agent audio in WebRTC-based contact center solutions is delivered through WebRTC technology to the agent web browser application running on their computer. In this case it is necessary to connect to these audio streams using different technologies.

Figure 20:
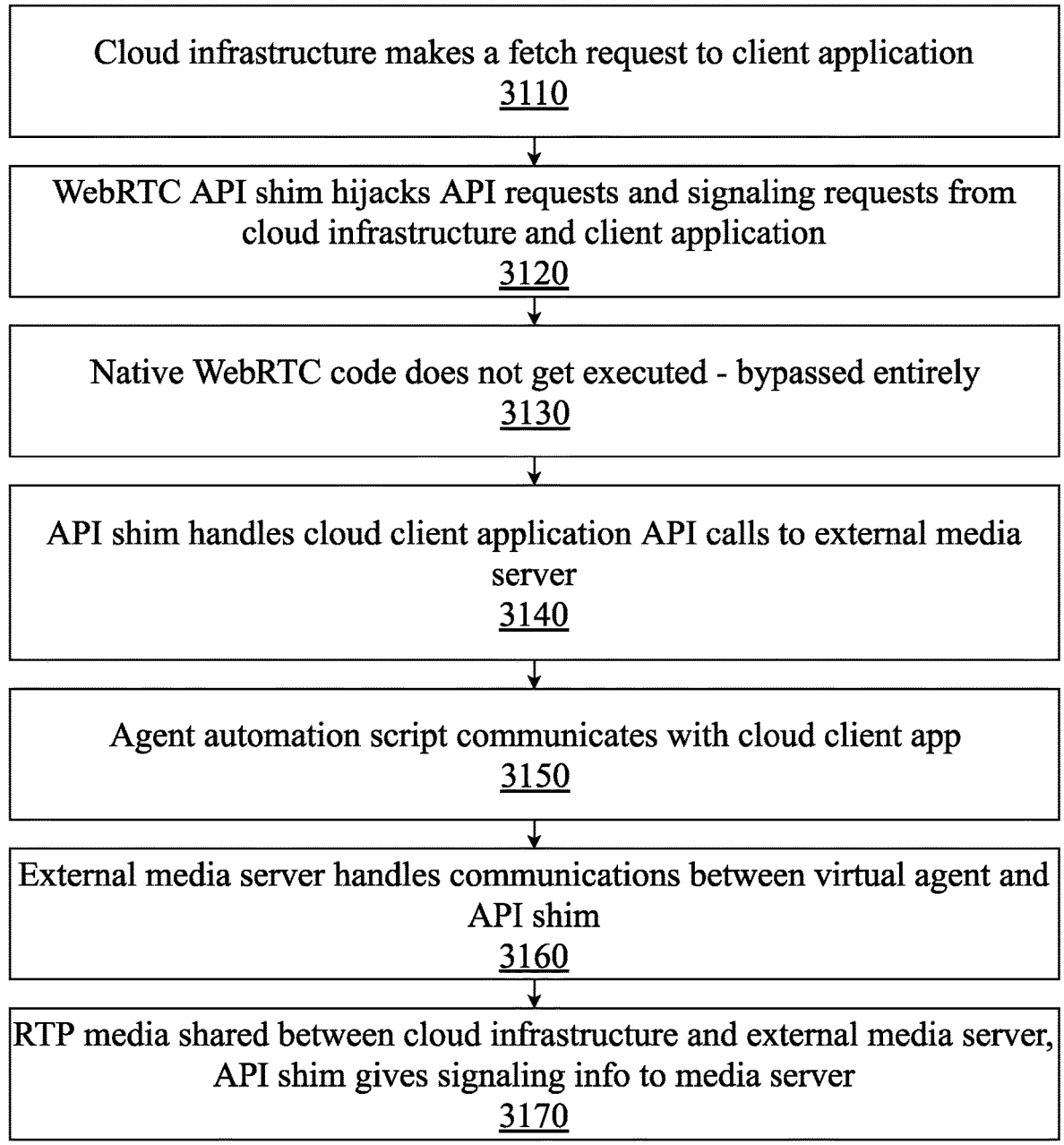
FIG. 20 is a method diagram illustrating steps in the operation of an API shim intercepting WebRTC API calls and enabling interactions between a cloud infrastructure or contact center, and an external media engine, with custom functionality in an agent browser, according to an embodiment.

FIG. 20 is a method diagram illustrating steps in the operation of an API shim intercepting WebRTC API calls and enabling interactions between a cloud infrastructure or contact center, and an external media engine, with custom functionality in an agent browser, according to an embodiment. A cloud infrastructure stack such as but not limited to AMAZON CONNECT™ makes an HTTP fetch request to client application 3110, over a network such as the Internet, at which point the client application receives the request and an injected WebRTC API shim hijacks the connection to the normal WebRTC APIs and functionality, the shim instead handling API requests and signaling requests from cloud infrastructure and client application 3120. Such a WebRTC API shim may take the form of a partial or complete polyfill of JAVASCRIPT™ tools and code, which prevents native WebRTC code from being executed, bypassing it entirely 3130. The API shim then handles any cloud client application API calls with a connection to an external media server 3140, as opposed to the internal media server normally used by WebRTC APIs, with an agent automation script communicating with and driving the cloud client app 3150. The agent automation script in this embodiment drives the actual API calls and agent behavior and responses to user communications, while the shim and external media server handle communications between the virtual agent and API shim 3160 under the direction of the agent automation script. An external media server may communicate using the RTP protocol, to receive and send media with a cloud infrastructure and itself, the API shim giving signaling info to the media server so it may properly connect to and exchange data with the cloud infrastructure system 3170. Using this method, a browser application may operate and communicate without alteration to a third party through a cloud contact center, and the audio and potentially video data may be redirected away from the browser itself towards an external media server to be handled in a different manner.

Figure 21:
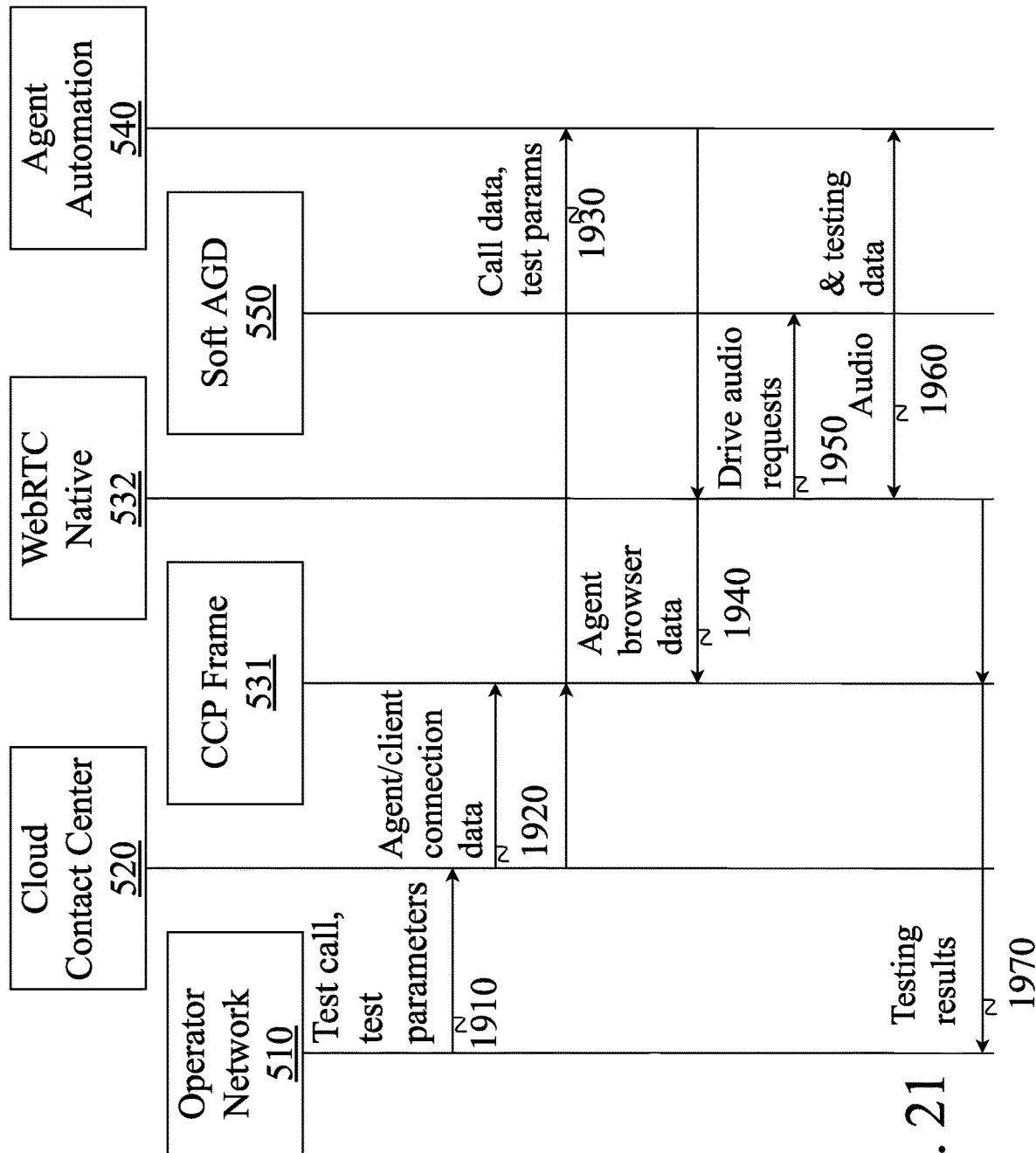
FIG. 21 is a message flow diagram illustrating data exchange between components used in a process of operating and testing real-time communications between web browsers with a dedicated desktop application, according to an embodiment.

FIG. 21 is a message flow diagram illustrating data exchange between components used in a process of operating and testing real-time communications between web browsers with a dedicated desktop application, according to an embodiment. Components actively sending and receiving messages include an operator network 510, a cloud contact center 520, a contact center control panel framework 531, a WebRTC native implementation 532, a software Audio Generation Device ("AGD") 550, and an automated agent engine 540. An operator network 510 sends a message to a cloud contact center 520 over a network such as the Internet, comprising a call on the contact center platform, and any relevant test parameters 1910 that might be transmissible to the contact center platform. In response to the call, the contact center sends connection data for the call to an agent to the control panel framework 1920 hosted by a web browser, and then forwards call data and test parameters (if any) 1930 to the web-based contact center agent application 531 and agent automation engine 540. The agent automation engine sends back agent data including the browser status to simulate an agent (in this context the "agent" may also be a "client" as far as agent-client calls are concerned, and may be better understood as a peer in this context) 1940 to both the WebRTC native API 532 and the web-based contact center agent application 531. The WebRTC native implementation 532 sends requests for audio to a software audio generation device 550, 1950, at which point the audio generation device sends the audio to either or both of the WebRTC implementation 532 and automated agent 540, 1960, to allow for end-to-end testing of the media connection between the simulated agent and the browser-native WebRTC client implementation. Results of the connection test and call data are sent back 1970 to the web-based contact center agent application 531 from the WebRTC API's 532, and then sent back to the operator network 510 during or after the test and call completion, depending on the implementation of the cloud contact center's control panel framework.

Figure 22:
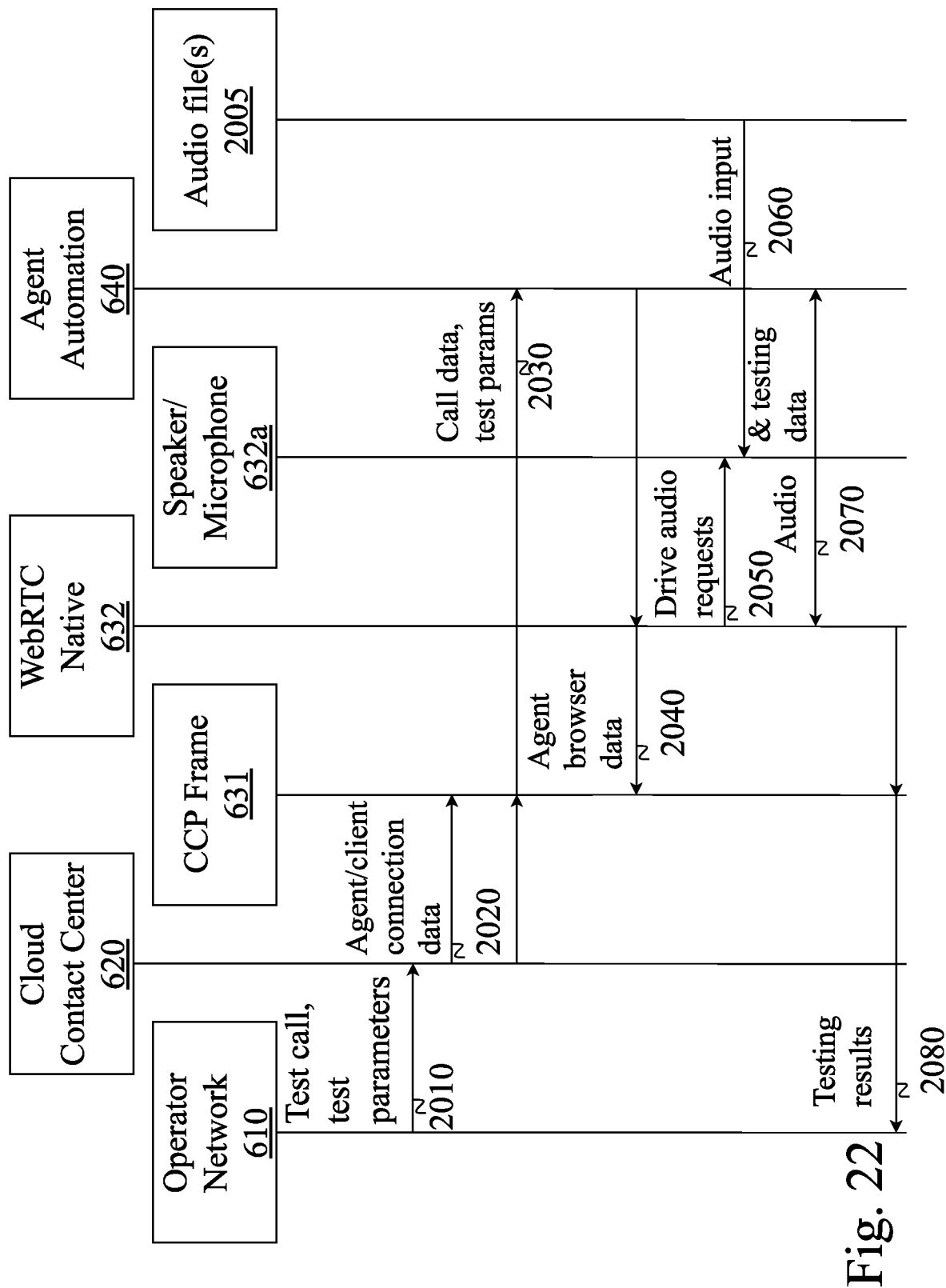
FIG. 22 is a message flow diagram illustrating data exchange between components used in a process of operating and testing real-time communications between web browsers without a dedicated desktop application, according to an embodiment.

FIG. 22 is a message flow diagram illustrating data exchange between components used in a process of operating and testing real-time communications between web browsers without a dedicated desktop application, according to an embodiment. Components actively sending and receiving messages include an operator network 610, a cloud contact center 620, a web-based contact center agent application 631, a WebRTC native implementation 632, a software microphone and possibly speaker 632*a*, an automated agent engine 640, and at least one but potentially a plurality of digital audio files 2005. An operator network 610 sends a message to a cloud contact center 620 over a network such as the Internet, comprising a call on the contact center platform, and any relevant test parameters 2010 that might be transmissible to the contact center platform. In response to the call, the contact center sends connection data for the call to an agent to the control panel framework 2020 hosted by a web browser, and then forwards call data and test parameters (if any) 2030 to the web-based contact center agent application and agent automation engine 640. The agent automation engine sends back agent data including the browser status to simulate an agent (in this context the "agent" may also be a "client" as far as agent-client calls are concerned, and may be better understood as a peer in this context) 2040 to both the WebRTC native API 632 and the web-based contact center agent application 631. The WebRTC native implementation 632 sends requests for audio to a software microphone 632*a*, 2050, the audio being provided by an audio file or files 2005, 2060, at which point the audio generation device sends the processed and generated audio to either or both of the WebRTC implementation 632 and automated agent 640, 2070, to allow for end-to-end testing of the media connection between the simulated agent and the browser-native WebRTC client implementation. Results of the connection test and call data are sent back 2080 to the web-based contact center agent application 631 from the WebRTC API's 632, and then sent back to the operator network 610 during or after the test and call completion, depending on the implementation of the cloud contact center's control panel framework.

Figure 23:
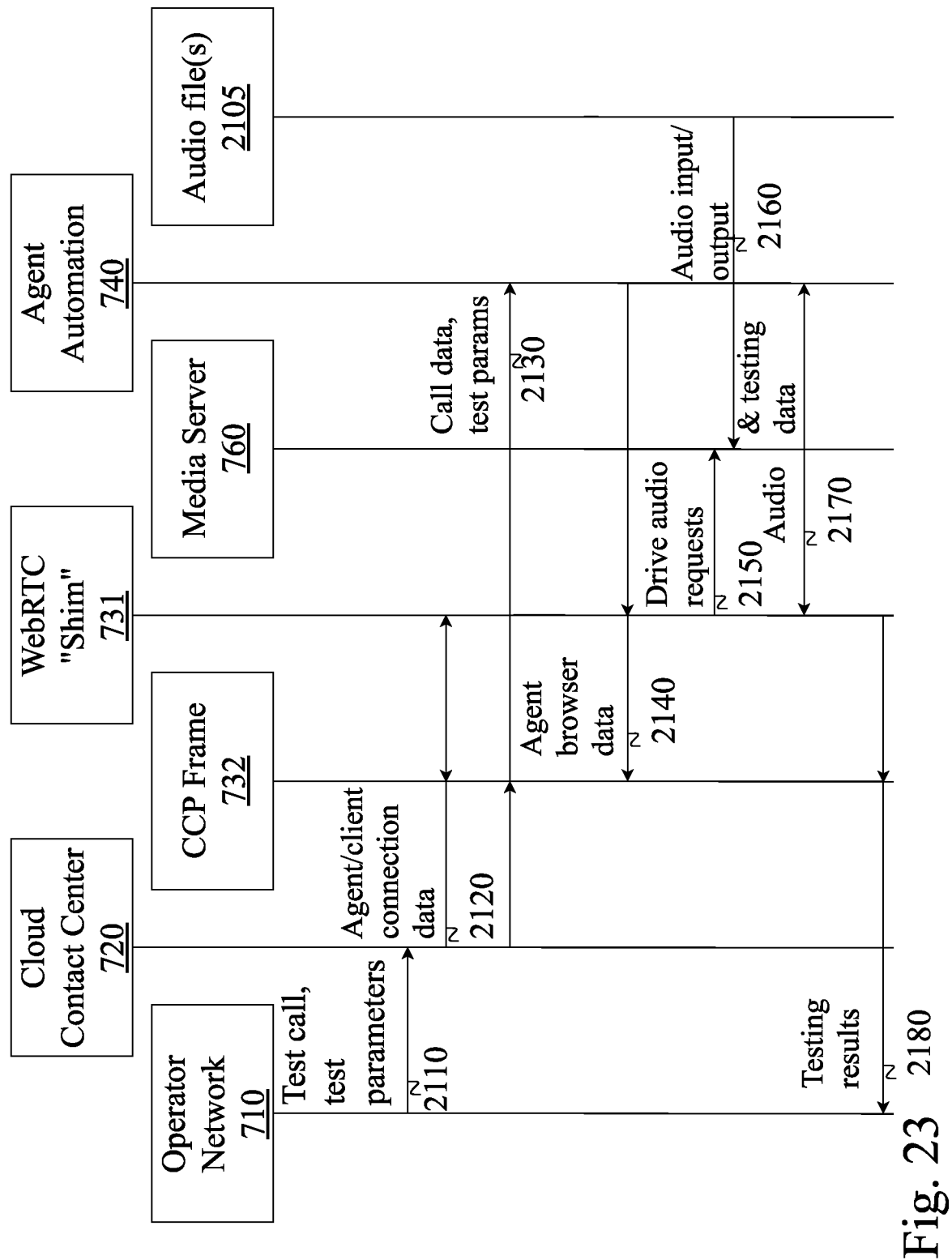
FIG. 23 is a message flow diagram illustrating data exchange between components used in a process of operating and testing real-time communications between web browsers using a cloud contact center such as AMAZONCONNECT™, according to an embodiment.

FIG. 23 is a message flow diagram illustrating data exchange between components used in a process of operating and testing real-time communications between web browsers using a cloud contact center such as AMAZON-CONNECT™, according to an embodiment. Components actively sending and receiving messages include an operator network 710, a cloud contact center 720, a contact center control panel framework 732, a WebRTC shim 731, a media server 760, an automated agent engine 740, and at least one but potentially a plurality of digital audio files 2105. An operator network 710 sends a message to a cloud contact center 720 over a network such as the Internet, comprising a call on the contact center platform, and any relevant test parameters 2110 that might be transmissible to the contact center platform. In response to the call, the contact center sends connection data for the call to an agent to the control panel framework 2120 hosted by a web browser, and then forwards call data and test parameters (if any) 2130 to the web-based contact center agent application 732 and agent automation engine 740. The agent automation engine sends back agent data including the browser status to simulate an agent (in this context the "agent" may also be a "client" as far as agent-client calls are concerned, and may be better understood as a peer in this context) 2140 to both the WebRTC shim APIs 731 and the web-based contact center agent application 732. The WebRTC shim 731 sends requests for audio to a media server 760, 2150, the audio being provided by an audio file or files 2105, 2160, at which point the audio generation device sends the processed and generated audio to either or both of the WebRTC implementation 731 and automated agent 740, 2170, to allow for end-to-end testing of the media connection between the simulated agent and the WebRTC shim implementation. Results of the connection test and call data are sent back 2180 to the web-based contact center agent application 732 from the WebRTC API's 731, and then sent back to the operator network 710 during or after the test and call completion, depending on the implementation of the cloud contact center's control panel framework.

Figure 24:
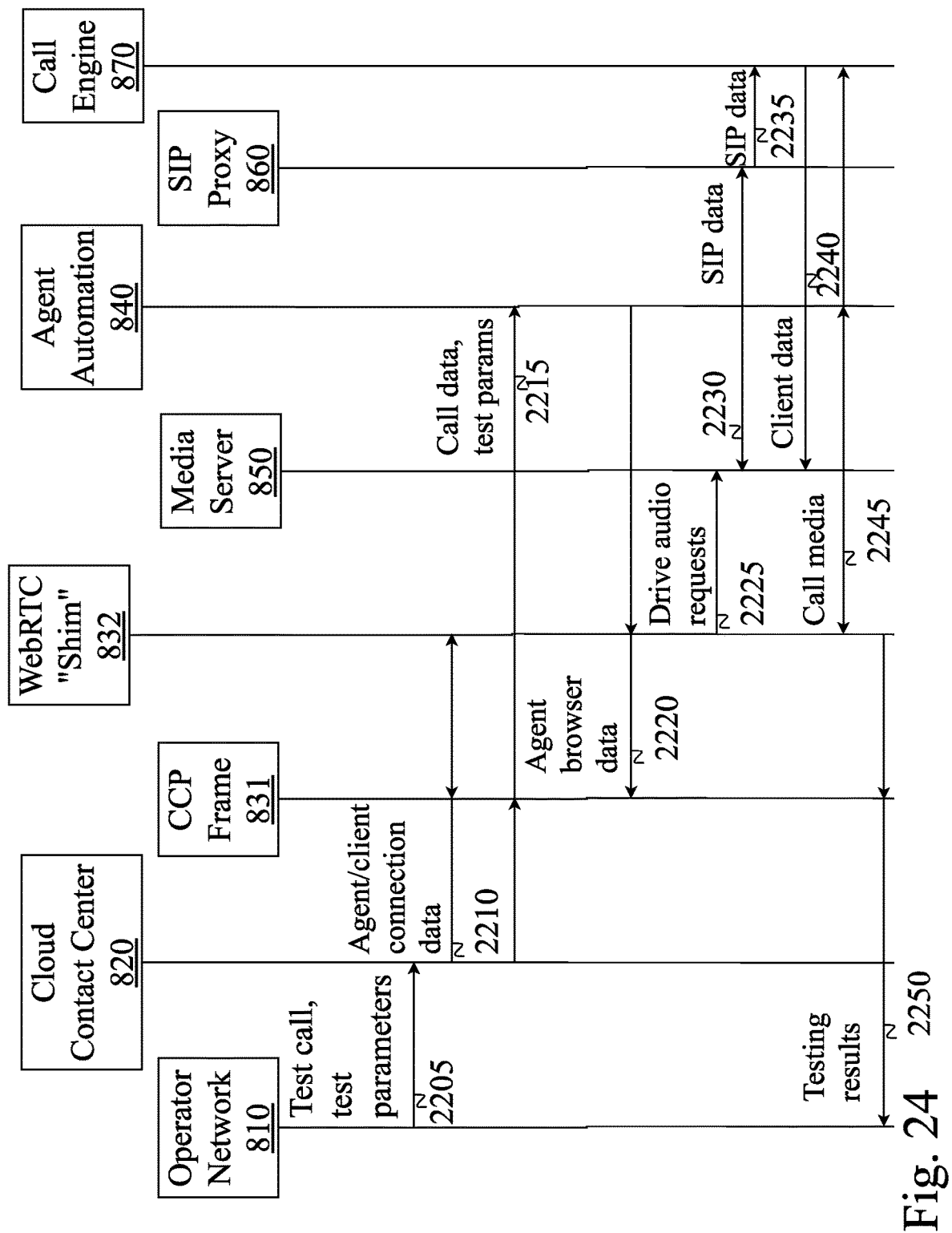
FIG. 24 is a message flow diagram illustrating data exchange between components used in a process of operating and testing real-time communications between web browsers using a media server as a proxy for a call engine, according to an embodiment.

FIG. 24 is a message flow diagram illustrating data exchange between components used in a process of operating and testing real-time communications between web browsers using a media server as a proxy for a call engine, according to an embodiment. FIG. 23 is a message flow diagram illustrating data exchange between components used in a process of operating and testing real-time communications between web browsers using a cloud contact center such as AMAZONCONNECT™, according to an embodiment. Components actively sending and receiving messages include an operator network 810, a cloud contact center 820, a contact center control panel framework 831, a WebRTC shim 832, a media server 850, an automated agent engine 840, an SIP proxy 860, and a call engine 870. An operator network 810 sends a message to a cloud contact center 820 over a network such as the Internet, comprising a call on the contact center platform, and any relevant test parameters 2205 that might be transmissible to the contact center platform. In response to the call, the contact center sends connection data for the call to an agent to the control panel framework 2210 hosted by a web browser, and then forwards call data and test parameters (if any) 2215 to the web-based contact center agent application 831 and agent automation engine 840. The agent automation engine sends back agent data including the browser status to simulate an agent (in this context the "agent" may also be a "client" as far as agent-client calls are concerned, and may be better understood as a peer in this context) 2220 to both the WebRTC shim APIs 832 and the web-based contact center agent application 831. The WebRTC shim 832 sends requests for audio to a media server 850, 2225, which communicates to the SIP proxy service 860 to establish SIP (Session Initiation Protocol) data. The SIP signaling data is returned by the SIP proxy 2230, and sent to the call engine 2235 so that the call engine can use the session information to send client data including any initial audio prompts 2240 to the media server 850, and receive unencrypted media in an RTP stream back 2245 from the media server, which also communicates this data to the WebRTC shim and therefore to the automated agent. Results of the connection test and call data are sent back 2250 to the web-based contact center agent application 831 from the WebRTC API's 832, and then sent back to the operator network 810 during or after the test and call completion, depending on the implementation of the cloud contact center's control panel framework.

Figure 25:
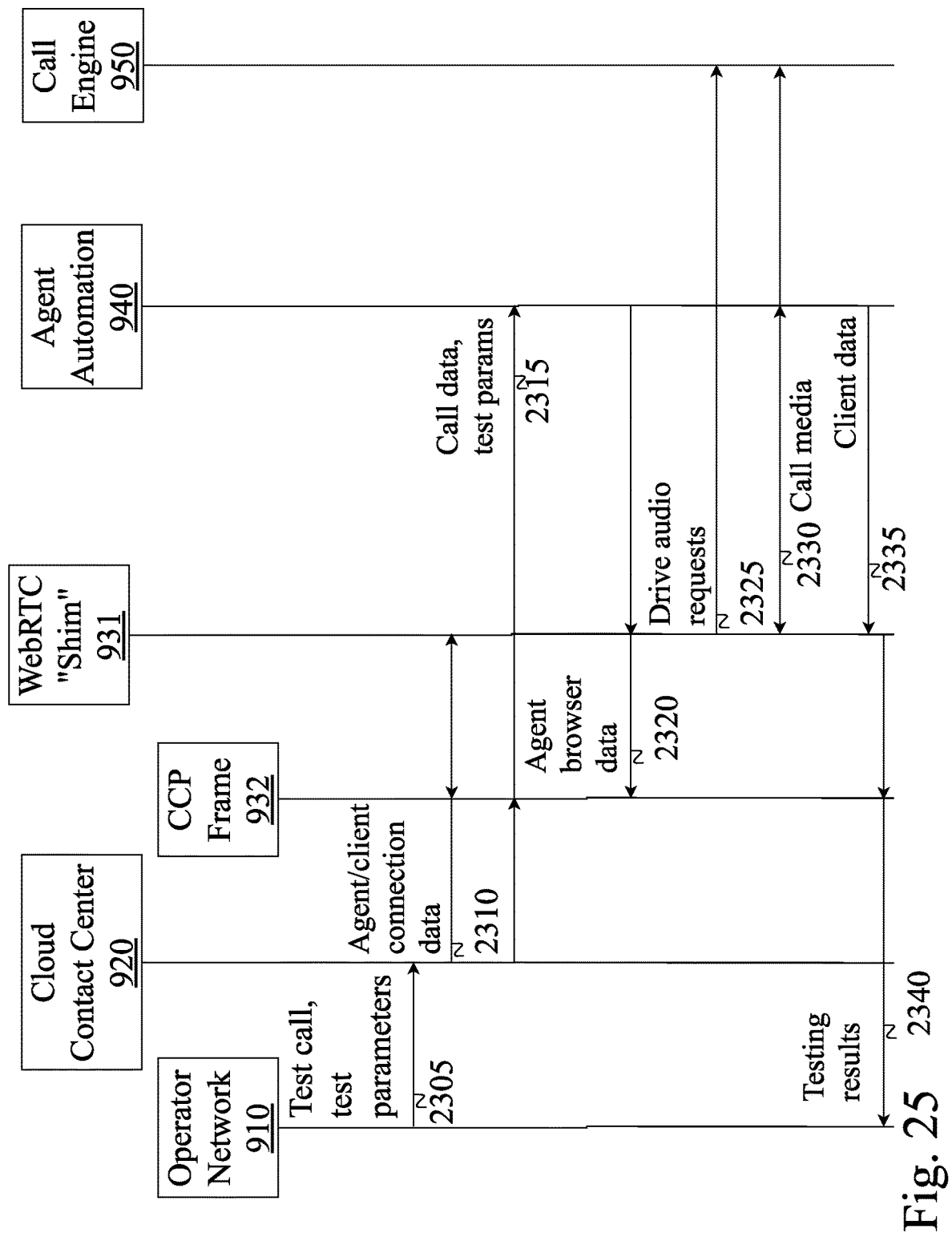
FIG. 25 is a message flow diagram illustrating data exchange between components used in a process of operating and testing real-time communications between web browsers with all server-side functions integrated into a call engine, according to an embodiment.

FIG. 25 is a message flow diagram illustrating data exchange between components used in a process of operating and testing real-time communications between web browsers with all server-side functions integrated into a call engine, according to an embodiment. FIG. 23 is a message flow diagram illustrating data exchange between components used in a process of operating and testing real-time communications between web browsers using a cloud contact center such as AMAZONCONNECT™, according to an embodiment. Components actively sending and receiving messages include an operator network 910, a cloud contact center 920, a contact center control panel framework 932, a WebRTC shim 931, an automated agent engine 940, and an operator call engine 950 that may be used by an agent, or used by a synthetic agent. An operator network 910 sends a message to a cloud contact center 920 over a network such as the Internet, comprising a call on the contact center platform, and any relevant test parameters 2305 that might be transmissible to the contact center platform. In response to the call, the contact center sends connection data for the call to an agent to the control panel framework 2310 hosted by a web browser, and then forwards call data and test parameters (if any) 2315 to the web-based contact center agent application 932 and agent automation engine 940. The agent automation engine sends back agent data including the browser status to simulate an agent (in this context the "agent" may also be a "client" as far as agent-client calls are concerned, and may be better understood as a peer in this context) 2320 to both the WebRTC shim APIs 931 and the web-based contact center agent application 932. The WebRTC shim 931 sends requests for audio to a call engine 950, 2325, at which point the call engine may send call media to the WebRTC shim, which then also sends the call media to the automated agent 2330. Client data from the automated agent's responses are sent to the WebRTC shim 2335, at the end of the exchanges of the media between these three components results of the connection test and call data are sent back 2340 to the web-based contact center agent application 932 from the WebRTC API's 931, and then sent back to the operator network 910 during or after the test and call completion, depending on the implementation of the cloud contact center's control panel framework.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit ("ASIC"), or on a network interface card.

Software/hardware hybrid implementations of at least some of the aspects disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific aspects, at least some of the features or functionalities of the various aspects disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some aspects, at least some of the features or functionalities of the various aspects disclosed herein may be implemented in one or more virtualized computing environments (e.g., network computing clouds, virtual machines hosted on one or more physical computing machines, or other appropriate virtual environments).

Figure 26:
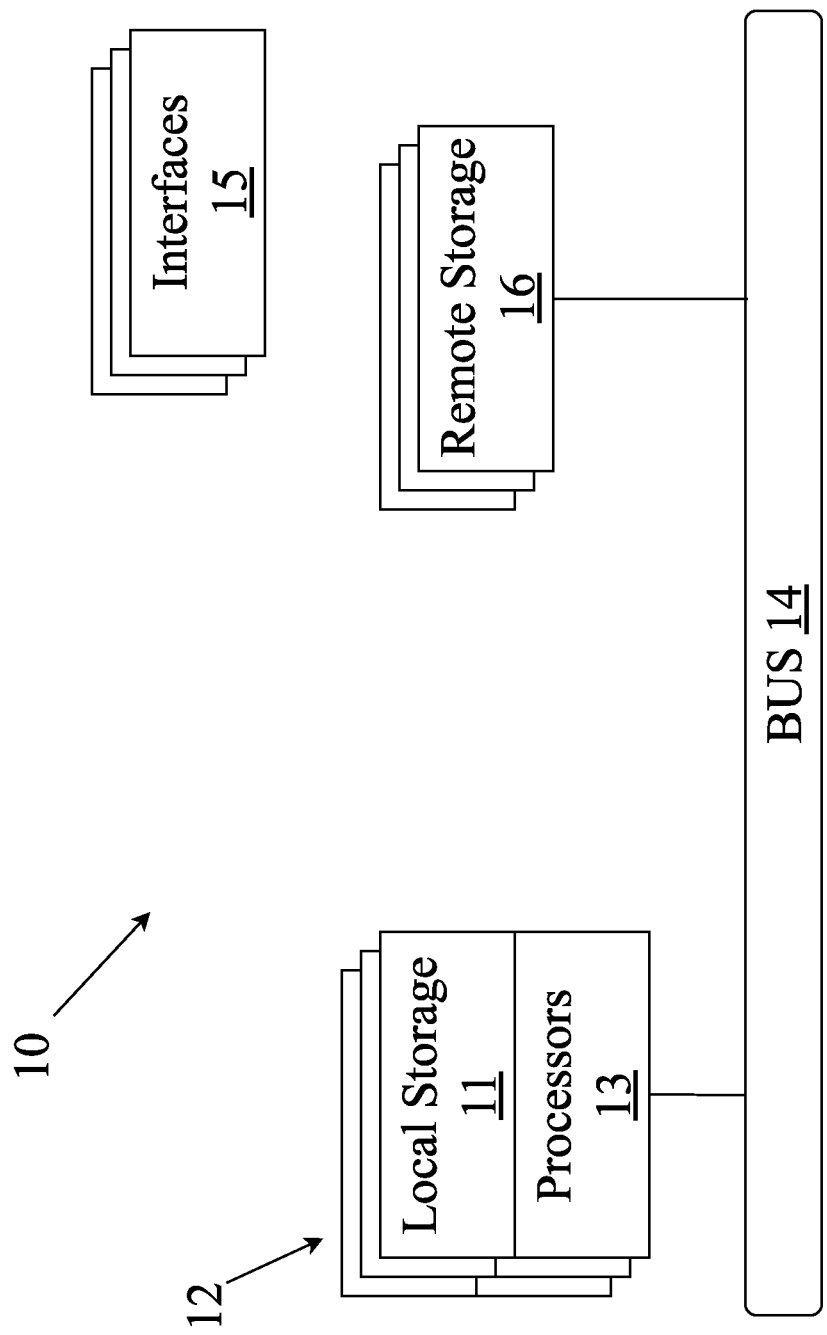
FIG. 26 is a block diagram illustrating an exemplary hardware architecture of a computing device.

Referring now to FIG. 26, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one embodiment, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one embodiment, a computing device 10 may be configured or designed to function as a server system utilizing CPU 12, local memory 11 and/or remote memory 16, and interface(s) 15. In at least one embodiment, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some embodiments, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a specific embodiment, a local memory 11 (such as non-volatile random access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 26 illustrates one specific architecture for a computing device 10 for implementing one or more of the inventions described herein, it is by no means the only device architecture on which at least a portion of the features and techniques described herein may be implemented. For example, architectures having one or any number of processors 13 may be used, and such processors 13 may be present in a single device or distributed among any number of devices. In one embodiment, a single processor 13 handles communications as well as routing computations, while in other embodiments a separate dedicated communications processor may be provided. In various embodiments, different types of features or functionalities may be implemented in a system according to the invention that includes a client device (such as a tablet device or smartphone running client software) and server systems (such as a server system described in more detail below).

Regardless of network device configuration, the system of the present invention may employ one or more memories or memory modules (such as, for example, remote memory block 16 and local memory 11) configured to store data, program instructions for the general-purpose network operations, or other information relating to the functionality of the embodiments described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 27:
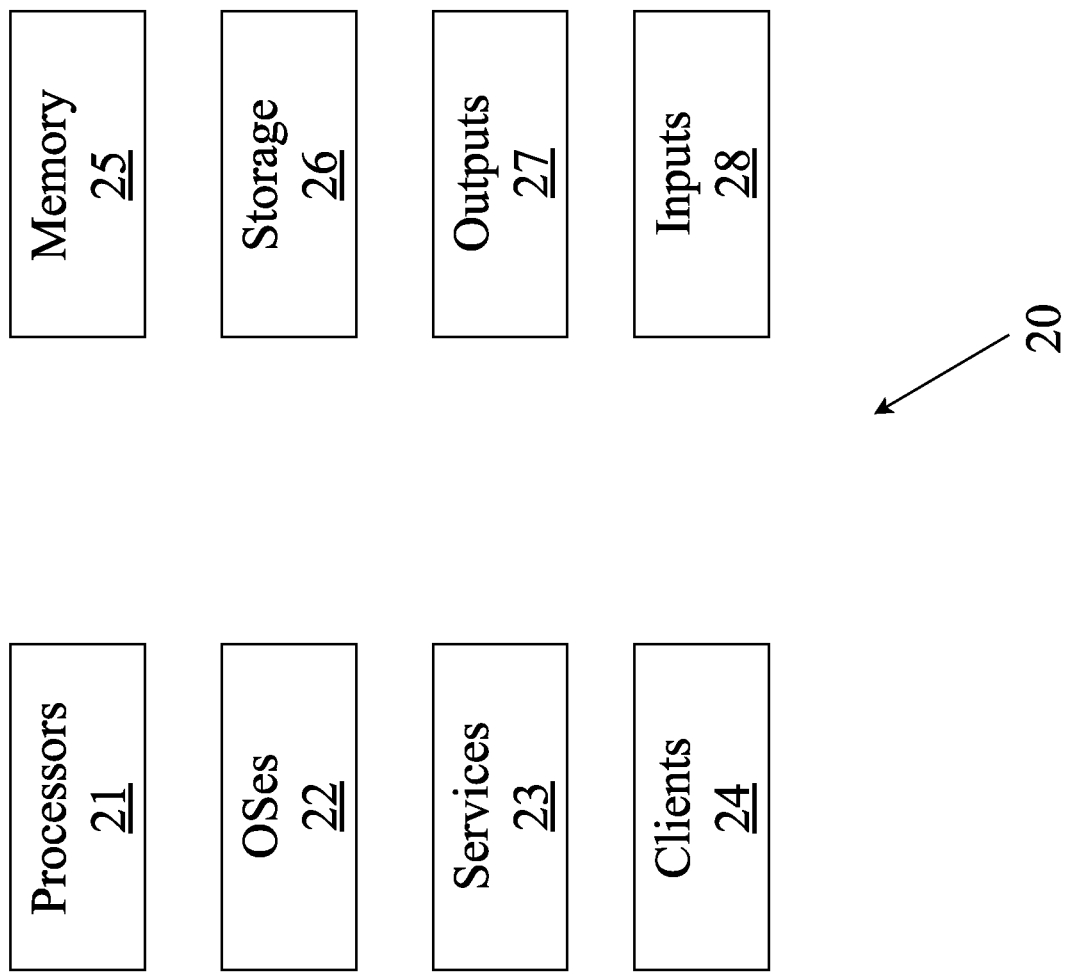
FIG. 27 is a block diagram illustrating an exemplary logical architecture for a client device.

In some embodiments, systems according to the present invention may be implemented on a standalone computing system. Referring now to FIG. 27, there is shown a block diagram depicting a typical exemplary architecture of one or more embodiments or components thereof on a standalone computing system. Computing device 20 includes processors 21 that may run software that carry out one or more functions or applications of embodiments of the invention, such as for example a client application 24. Processors 21 may carry out computing instructions under control of an operating system 22 such as, for example, a version of MICROSOFT WINDOWS™ operating system, APPLE OSX™ or iOS™ operating systems, some variety of the Linux operating system, ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 26). Examples of storage devices 26 include flash memory, magnetic hard drive, CD-ROM, and/or the like.

Figure 28:
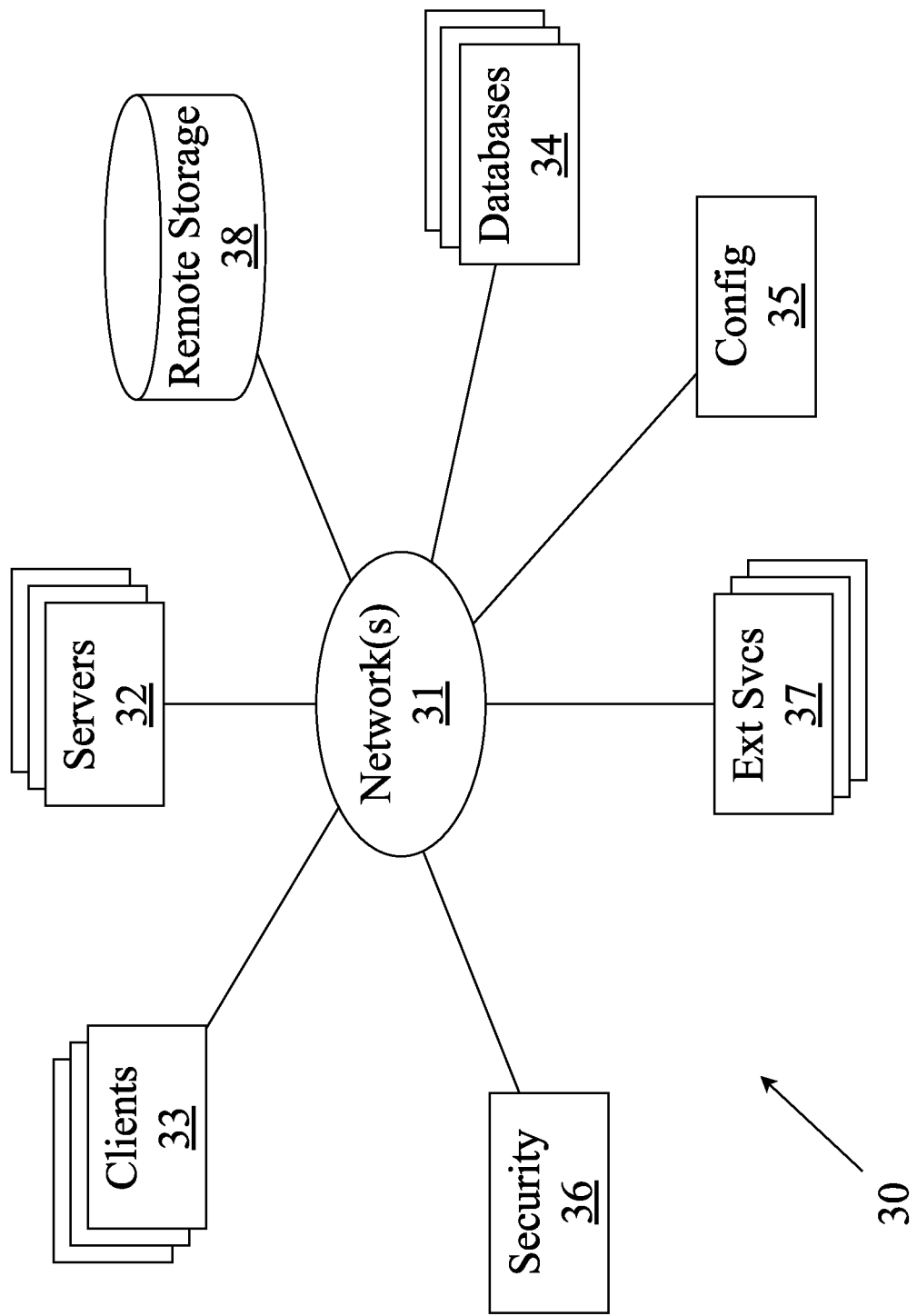
FIG. 28 is a block diagram showing an exemplary architectural arrangement of clients, servers, and external services.

In some embodiments, systems of the present invention may be implemented on a distributed computing network, such as one having any number of clients and/or servers. Referring now to FIG. 28, there is shown a block diagram depicting an exemplary architecture 30 for implementing at least a portion of a system according to an embodiment of the invention on a distributed computing network. According to the embodiment, any number of clients 33 may be provided. Each client 33 may run software for implementing client-side portions of the present invention; clients may comprise a system 20 such as that illustrated in FIG. 27. In addition, any number of servers 32 may be provided for handling requests received from one or more clients 33. Clients 33 and servers 32 may communicate with one another via one or more electronic networks 31, which may be in various embodiments any of the Internet, a wide area network, a mobile telephony network (such as CDMA or GSM cellular networks), a wireless network (such as WiFi, WiMAX, LTE, and so forth), or a local area network (or indeed any network topology known in the art; the invention does not prefer any one network topology over any other). Networks 31 may be implemented using any known network protocols, including for example wired and/or wireless protocols.

In addition, in some embodiments, servers 32 may call external services 37 when needed to obtain additional information, or to refer to additional data concerning a particular call. Communications with external services 37 may take place, for example, via one or more networks 31. In various embodiments, external services 37 may comprise web-enabled services or functionality related to or installed on the hardware device itself. For example, in an embodiment where client applications 24 are implemented on a smartphone or other electronic device, client applications 24 may obtain information stored in a server system 32 in the cloud or on an external service 37 deployed on one or more of a particular enterprise's or user's premises.

In some embodiments of the invention, clients 33 or servers 32 (or both) may make use of one or more specialized services or appliances that may be deployed locally or remotely across one or more networks 31. For example, one or more databases 34 may be used or referred to by one or more embodiments of the invention. It should be understood by one having ordinary skill in the art that databases 34 may be arranged in a wide variety of architectures and using a wide variety of data access and manipulation means. For example, in various embodiments one or more databases 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some embodiments, variant database architectures such as column-oriented databases, in-memory databases, clustered databases, distributed databases, or even flat file data repositories may be used according to the invention. External remote storage 38 may be used in addition or in place of any local storage. It will be appreciated by one having ordinary skill in the art that any combination of known or future database technologies may be used as appropriate, unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most embodiments of the invention may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments of the invention without limitation, unless a specific security 36 or configuration system 35 or approach is specifically required by the description of any specific embodiment.

Figure 29:
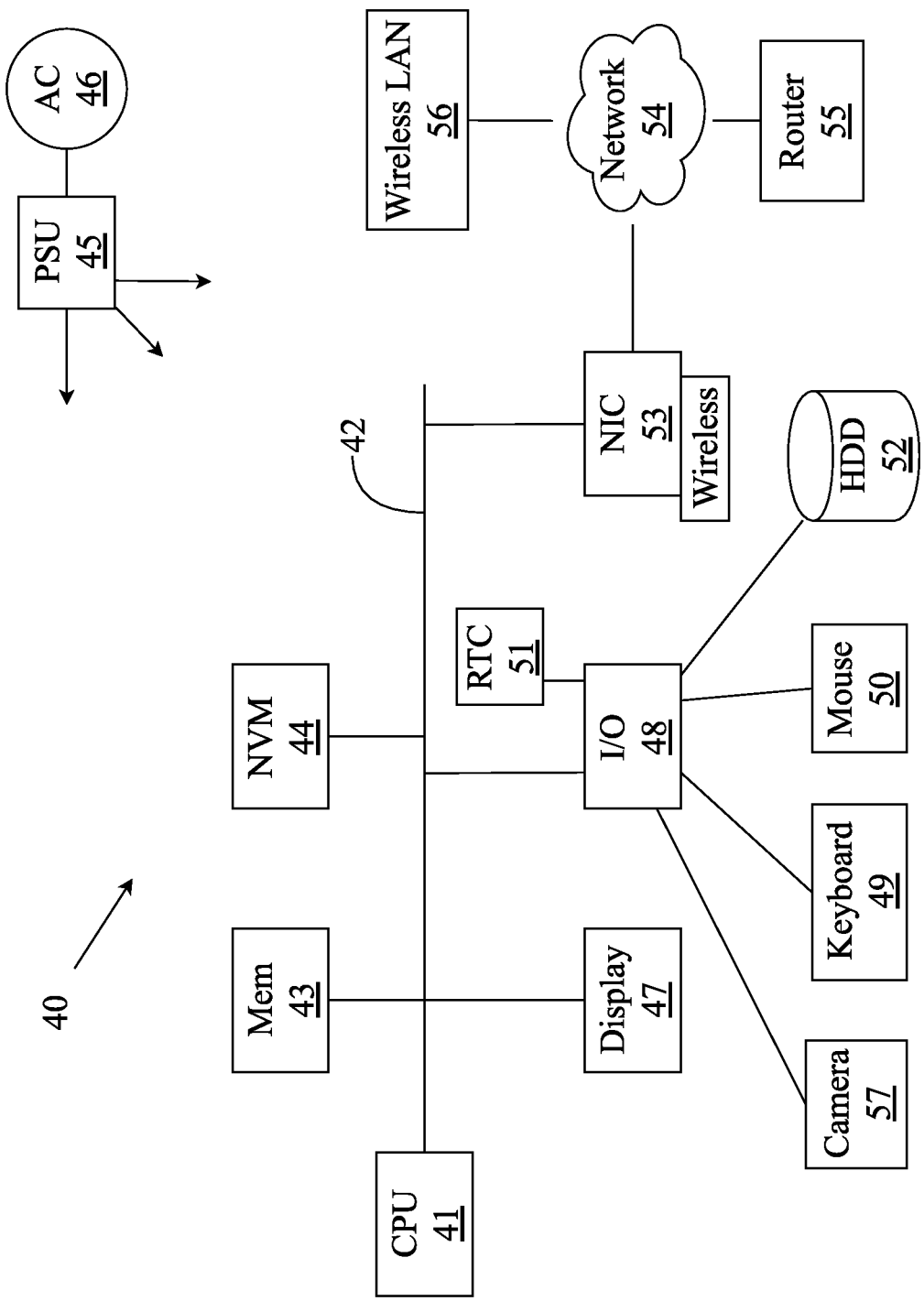
FIG. 29 is another block diagram illustrating an exemplary hardware architecture of a computing device.

FIG. 29 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to keyboard 49, pointing device 50, hard disk 52, real-time clock 51, and potentially also a camera 57. NIC 53 connects to network 54, which may be the Internet or a local network 56, which local network may or may not have connections to the Internet. Such a network may utilize a router 55 or wired or wireless Local Area Network (LAN) 56. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

Figure 30:
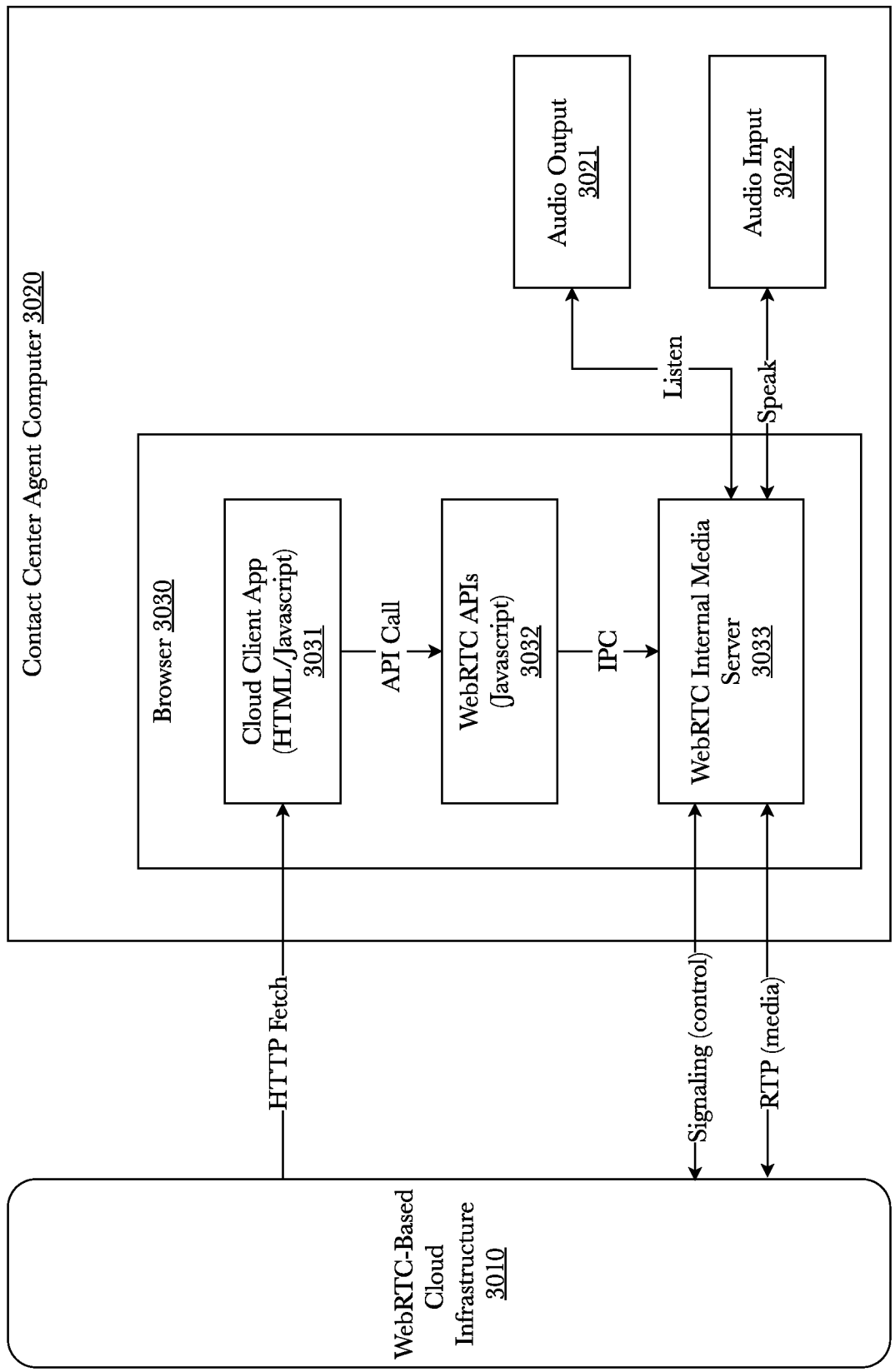
FIG. 30 (PRIOR ART) is a block diagram showing the typical mode of operation of existing WebRTC browser implementations in which WebRTC APIs use an internal media server for media processing.

FIG. 30 (PRIOR ART) is a block diagram showing the typical mode of operation of existing WebRTC browser implementations in which WebRTC APIs use an internal media server for media processing. WebRTC browser 3030 client applications 3031 (e.g., the Amazon Connect Contact Control Panel (CCP)) utilize a set of application programming interfaces 3032 (e.g., the WebRTC Native Code package) exposed by the web browser 3030 to allow for the environment setup, initiation, and control of media sessions between the client application 3031 and some other entity 3010. In the case of contact center applications, for example, the web browser 3030 would be instantiated on a contact center agent computer 3020, and the other entity 3010 would be a contact center framework such as Amazon Connect or Twilio Flex running on servers in the cloud. The APIs 3032 provide control of a black box communication system built into the browser, where the application does not need to concern itself with actual network communication, data decoding, or playback/recording devices. The APIs 3032 hide all these intricacies and utilize functionality in-built in the browser, such as a built-in media server 3033 to process the network packets, and send them to/from audio outputs 3021 (e.g., speakers) and audio inputs 3022 (e.g., microphones). However, this standard WebRTC implementation has drawbacks from the standpoint of media (audio/video) testing. First, the browser media server code is not optimized to run multiple sessions on a single server, so does not scale well and is difficult to use for load testing. Multiple sessions and/or connections is very CPU intensive and the internal media server is very CPU sensitive. At the slightest hint of CPU starvation, media quality drops dramatically, making media quality analysis of the connection impossible. Second, the standard WebRTC implementation sends the audio to the standard operating system (e.g., Windows) audio devices, which are not optimal for access and control for voice quality testing. Modifying the client application 3031 in many contexts is not feasible (e.g., in contact center applications where the contact center does not want to test a customized version of its application), so another method of routing media for separate processing outside of the browser is needed.

Figure 31:
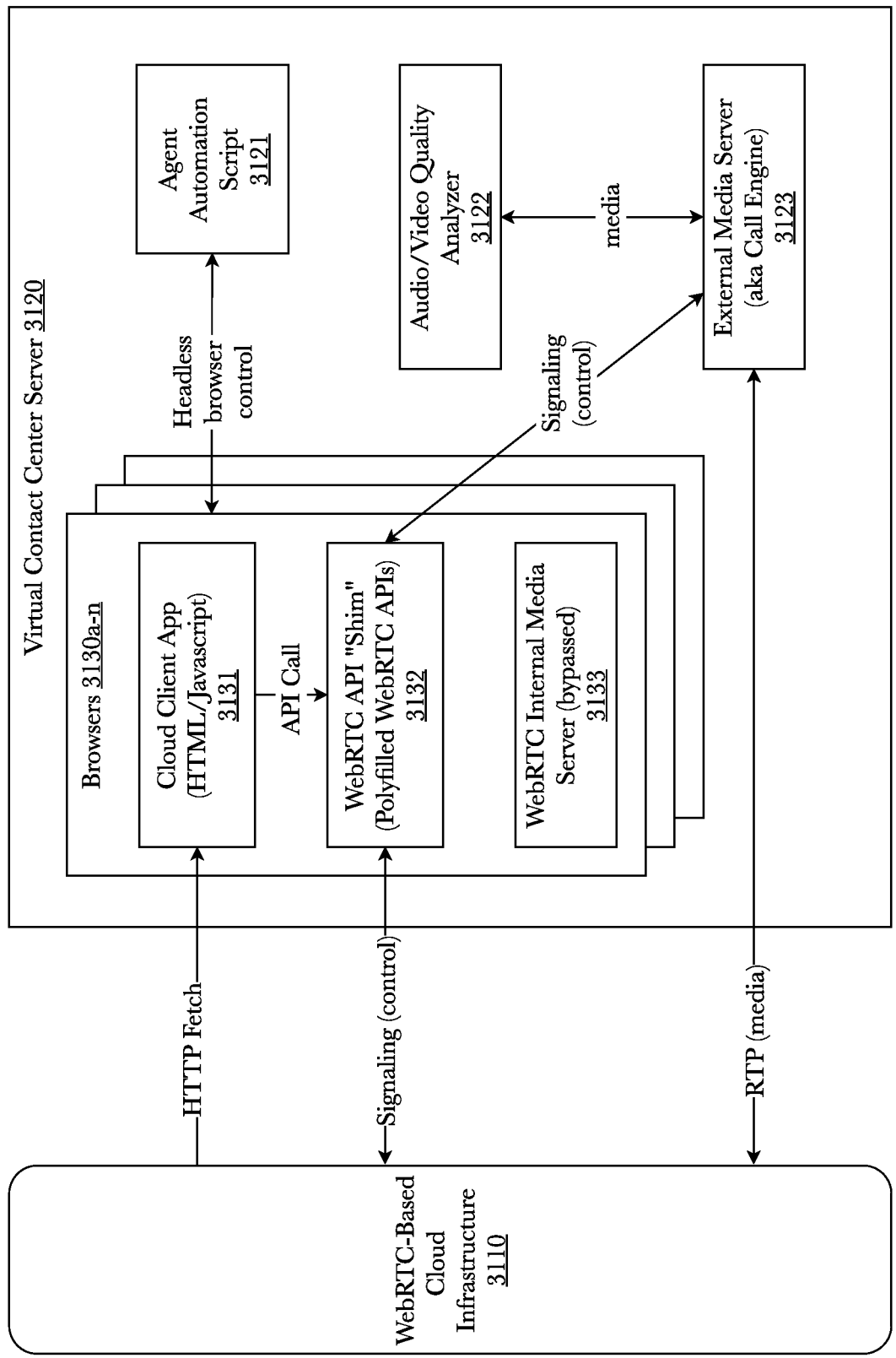
FIG. 31 is a block diagram showing the use of a WebRTC "shim" to intercept WebRTC media for separate processing outside of the browser through polyfill of Javascript WebRTC APIs.

FIG. 31 is a block diagram showing the use of a WebRTC "shim" to intercept WebRTC media for separate processing outside of the browser through polyfill of Javascript WebRTC APIs. In this embodiment, a server 3120 instantiates one or more browsers 3130a-n, each running a client application 3131 (e.g., the Amazon Connect Contact Control Panel (CCP)). The browser(s) utilize a set of WebRTC application programming interfaces 3032 (e.g., the WebRTC Native Code package) exposed by the web browsers 3130a-n to allow for the environment setup, initiation, and control of media sessions between the client application 3131 and some other entity 3110. In the case of contact center applications, for example, the web browsers 3130a-n would be instantiated on a server acting as a virtual contact center 3120 or on a server at an actual contact center, and the other entity 3110 would be a contact center framework such as Amazon Connect or Twilio Flex running on servers in the cloud. In contrast to the standard WebRTC implementation, however, in this embodiment, a software "shim" is used to bypass the WebRTC internal media server 3123 and redirect the media to an external media server 3123 (in some cases called a call engine) for analysis by an audio/video quality analyzer 3122.

The "shim" consists of changing the operating code of one or more of the WebRTC APIs through a process called "polyfilling." Polyfilling is the use of JavaScript to insert code into the API which substitutes for the native code in the API and overrides any the operation of the API inside of the browser Javascript engine. When the client application 3131 makes an API call for media handling, the polyfilled code intercepts the API call. Instead of resulting in negotiation of call media with the browser's 3130a-n internal media server 3133, the API call results in negotiation of the media session with an external media server application 3123, replicating all requisite the functionality of WebRTC's RTCPeerConnection object with this external media server negotiation.

Once the external media server application has access to the media streams, the media streams can be tested for audio and/or video quality in both directions (i.e., from WebRTC-based cloud infrastructure 3110 to the external media server 3123, and vice-versa) using an audio/video quality analyzer 3122 separate from the standard operating system (e.g., Windows) audio devices. The external media server application 3123 can be configured specifically to perform well when processing multiple media streams concurrently, allowing the operation of multiple concurrent testing agents at a much higher density (i.e., scalability). The testing agents may be automated through use of an agent automation script 3121, allowing a high volume of automated testing.

In various embodiments, functionality for implementing systems or methods of the present invention may be distributed among any number of client and/or server components. For example, various software modules may be implemented for performing various functions in connection with the present invention, and such modules may be variously implemented to run on server and/or client components.

The skilled person will be aware of a range of possible modifications of the various embodiments described above. Accordingly, the present invention is defined by the claims and their equivalents.

What is claimed is:

1. A system for operating and testing real-time communications between web browsers and contact centers, comprising:
    a Web Real-Time Communications ("WebRTC") application programming interface ("API") shim comprising a second plurality of programming instructions stored in a memory and operating on a processor, wherein the second plurality of programming instructions, when operating on the processor, cause the processor to:
    communicate with a cloud contact center, through an operator network;
    modify the standard behavior of a hosting web browser;
    handle and intercept WebRTC API calls to a customer service agent's software, preventing a default browser WebRTC implementation from being utilized;
    communicate with media sources across a network to receive transmitted audio;
    facilitate communications with other computers generating the customer side of a call center conversation;

intercept and handle WebRTC API calls to software operating a WebRTC API, preventing the default browser WebRTC implementation from being utilized;

modify a standard behavior of the web browser or other software operating a WebRTC API;

intercept and handle WebRTC API requests that enumerate available input/output audio devices available to the browser to use; and select a specific pair of audio input/output devices to use for a browser or other software session;

an external media server comprising at least a processor, a memory, and a third plurality of programming instructions stored in the memory and operating on the processor, wherein the third plurality of programming instructions, when operating on the processor, cause the processor to:

encode and decode audio and video digital data;

receive signal data from the WebRTC API shim to facilitate a connection between the external media server and a cloud contact center;

receive media data comprising at least audio data from a cloud contact center;

send pre-recorded reference audio for testing to the far end of the media connections as requested by an operator network;

receive transmitted audio and calculate voice quality by a plurality of algorithms that analyze the received audio using a full reference audio mechanisms; and an audio processing application comprising at least a processor, a memory, and a fourth plurality of programming instructions stored in the memory and operating on the processor, wherein the fourth plurality of programming instructions, when operating on the processor, cause the processor to:

operate a plurality of virtual audio devices;

relay audio from the browser WebRTC session to another software application via a virtual audio cable;

utilize a plurality of virtual audio devices to encode and decode digital audio data;

utilize to send pre-recorded reference audio to the browser for transmission in the WebRTC communication for testing of media connections; and utilize virtual audio devices to receive transmitted audio on the WebRTC session and calculate voice quality by a plurality of algorithms that analyze the received audio.

2. The system of claim 1, wherein processing of outgoing and incoming audio feeds, and video feeds if provided, is done by separate media server software operated in tandem with WebRTC mechanisms employed by a contact center application running inside of the browser.

3. The system of claim 1, wherein a traversal using relays around network address translation server is used to relay requests from a cloud contact center to a computer operating a WebRTC engine.

4. The system of claim 1, further comprising:

a software virtualized microphone comprising at least a processor, a memory, and a fifth plurality of programming instructions stored in the memory and operating on the processor, wherein the fifth plurality of programming instructions, when operating on the processor, cause the processor to:

take priority of operation of audio input over other connected audio devices, if any, attached to a host computer;

wherein the operation of the software virtualized microphone is dictated by the WebRTC API shim;

generate synthetic audio input to mimic an agent's communications with a user; and transmit the synthetic audio to a WebRTC-based media conversation between peer computers, such as between an agent and customer.

5. The system of claim 1, further comprising:

a software virtualized speaker comprising at least a processor, a memory, and a sixth plurality of programming instructions stored in the memory and operating on the processor, wherein the sixth plurality of programming instructions, when operating on the processor, cause the processor to:

take priority of operation of audio output over other connected audio devices, if any, attached to a host computer;

wherein the operation of the software virtualized speaker is dictated by a browser WebAudio API shim; and capture synthetic audio input to mimic an agent's communications with a customer.

6. The system of claim 1, wherein a WebRTC based web-browser-application communicates with an external media server that handles media processing and agent automation for the purposes of testing automated agent or client responses in a media communications session.

7. The system of claim 1, wherein the WebRTC API shim is a polyfill of code that may perform a bespoke negotiation to a custom media server for the purposes of calculating voice quality outside of the limitation of the browser-native WebRTC implementation.

8. A method for operating and testing real-time communications between web browsers and contact centers, comprising the steps of:

generating a request for testing at least one customer to agent media connection through a cloud contact center, using an operator network;

receiving results of testing, using an operator network;

intercepting and handling Web Real-Time Communications ("WebRTC") application programming interface ("API") calls to a web browser or other software operating a WebRTC API, preventing the default browser WebRTC implementation from being utilized, using a WebRTC API shim and replacing it with an alternative media processor;

modifying the standard behavior of the web browser or other software operating a WebRTC API, using the WebRTC API shim;

intercepting and handling WebRTC API requests that enumerate available input/output audio devices available to the browser to use, using the WebRTC API shim;

selecting a specific pair of audio input/output devices to use for a browser or other software session, using the WebRTC API shim;

operating a plurality of virtual audio devices, using an audio processing application;

relaying audio from the browser to another audio processing application with a virtual audio cable;

utilizing virtual audio devices through the operation of a plurality of virtual audio devices, to encode and decode audio digital data, using an audio processing application;

utilizing virtual audio devices to send pre-recorded reference audio to the browser WebRTC session for testing of media connections, using an audio processing application; and utilizing virtual audio devices to receive transmitted audio and calculate voice quality by a plurality of algorithms that analyze the received audio using at least a full reference audio mechanism, using an audio processing application.

9. The method of claim 8, wherein processing of outgoing and incoming audio feeds, and video feeds if provided, is done by separate media server software operated in tandem with WebRTC mechanisms employed by a contact center application running inside of the browser.

10. The method of claim 8, wherein a traversal using relays around network address translation server is used to relay requests from a cloud contact center to a computer operating a WebRTC engine.

11. The method of claim 8, further including the steps of:
taking priority of operation of audio input over other connected audio devices, if any, attached to a host computer, using a software virtualized microphone;
wherein the operation of the software virtualized microphone is dictated by the WebRTC API shim, using a software virtualized microphone;
generating synthetic audio input to mimic an agent's communications with a user, using a software virtualized microphone; and
transmitting the synthetic audio to a WebRTC-based media conversation between peer computers, such as between an agent and customer, using a software virtualized microphone.

12. The method of claim 8, further including:
taking priority of operation of audio output over other connected audio devices, if any, attached to a host computer, using a software virtualized speaker;
wherein the operation of the software virtualized speaker is dictated by the WebRTC API shim, using a software virtualized speaker; and
capturing synthetic audio input to mimic an agent's communications with a user, using a software virtualized speaker.

13. The method of claim 8, wherein a WebRTC based web-browser-application communicates with an external media server that handles media processing and agent automation for the purposes of testing automated agent or client responses in a media communications session.

14. The method of claim 8, wherein the WebRTC API shim is a polyfill of code that may perform a bespoke negotiation to a custom media server for the purposes of calculating voice quality outside of the limitation of the browser-native WebRTC implementation.

\* \* \* \* \*